(12) United States Patent
Melink

(10) Patent No.: US 7,048,199 B2
(45) Date of Patent: May 23, 2006

(54) KITCHEN EXHAUST OPTIMAL TEMPERATURE SPAN SYSTEM AND METHOD

(75) Inventor: Stephen K. Melink, Cincinnati, OH (US)

(73) Assignee: Melink Corporation, Cincinnati, OH (US)

( * ) Notice: Subject to any disclaimer, the term of this patent is extended or adjusted under 35 U.S.C. 154(b) by 225 days.

(21) Appl. No.: 10/760,797

(22) Filed: Jan. 20, 2004

(65) Prior Publication Data

US 2005/0156053 A1 Jul. 21, 2005

(51) Int. Cl.
*F24F 7/00* (2006.01)
*B08B 15/02* (2006.01)
*F24C 15/20* (2006.01)

(52) U.S. Cl. .................. 236/49.3; 454/61; 126/299 R; 126/299 D

(58) Field of Classification Search ............... 236/49.3; 126/299 R, 299 D, 312, 301, 302, 303; 454/67, 454/49, 56, 61; 62/186, 78
See application file for complete search history.

(56) References Cited

U.S. PATENT DOCUMENTS

| | | | |
|---|---|---|---|
| 4,903,685 A | 2/1990 | Melink | 126/299 |
| 6,170,480 B1 | 1/2001 | Melink et al. | 126/299 |
| 6,188,189 B1 * | 2/2001 | Blake | 318/471 |
| 6,386,460 B1 * | 5/2002 | Riley et al. | 236/49.3 |
| 6,467,695 B1 * | 10/2002 | Riley et al. | 236/49.3 |
| 6,467,696 B1 * | 10/2002 | Riley et al. | 236/49.3 |
| 6,481,635 B1 * | 11/2002 | Riley et al. | 236/49.3 |

* cited by examiner

*Primary Examiner*—Chen Wen Jiang
(74) *Attorney, Agent, or Firm*—Wood Herron & Evans LLP

(57) ABSTRACT

An exhaust control system (72) for a commercial or institutional kitchen exhaust system (32) is disclosed in which the exhaust fan speed is optimized for the amount of cooking heat and cooking by-product generated by the cooking units, as well as for comfort in the kitchen (12). Kitchen comfort is determined by sensing temperature, humidity, noxious gases, smoke, odor, or some combination thereof. In particular, exhaust air temperature can be used by the control system (72) to modulate fan speed from a minimum value to a maximum value based on the minimum and maximum temperatures that define a particular temperature span. During operation, the control system (72) continues to monitor environmental parameters of the kitchen (12) to determine if the current temperature span provides optimal performance. Upon determining that the current temperature span is no longer the optimal one, the control system (72) operates the exhaust system (32) according to a different temperature span.

44 Claims, 11 Drawing Sheets

KITCHEN EXHAUST OPTIMAL TEMPERATURE SPAN SYSTEM AND METHOD

BACKGROUND OF THE INVENTION

I. Field of the Invention

The present invention relates to commercial and institutional kitchen exhaust systems, and more particularly, to an exhaust rate control method and apparatus for such exhaust systems.

II. Discussion of Prior Art

Commercial and institutional kitchens are equipped to prepare food for large numbers of people and may form part of or adjoin larger facilities such as restaurants, hospitals and the like. Such kitchens are typically equipped with one or more commercial duty cooking units capable of cooking large amounts of food. On such a scale, the cooking process may generate substantial amounts of cooking heat and airborne cooking by-products such as water vapor, grease particulates, smoke and aerosols, all of which must be exhausted from the kitchen so as not to foul the environment of the facility. To this end, large exhaust hoods are usually provided over the cooking units, with duct work connecting the hood to a motor driven exhaust fan located outside the facility such as on the roof or on the outside of an external wall. As the fan is rotated by the motor, air within the kitchen environment is drawn into the hood and exhausted to the outside atmosphere. In this way, cooking heat and cooking by-products generated by the cooking units follow an air flow path defined between the cooking units and outside through the hood to be exhausted from the kitchen before they escape into the main kitchen environment and perhaps into the rest of the facility.

In many conventional installations, the motor driving the exhaust fan rotates at a fixed speed. The exhaust fan thus rotates at a fixed speed as well and, therefore, tends to draw air through the hood at a constant or fixed volume rate without regard to the amount of heat or cooking by-product actually being generated. As a result, there are often times throughout a working shift where the system may be under or over-exhausting. Under-exhausting allows heat and/or cooking by-products to build up in the kitchen or other parts of the facility, which can create discomfort and also overload the building heating and ventilation or air conditioning systems ("HVAC"). Similarly, over-exhausting wastes air that has been conditioned by the building HVAC, thus requiring further burden on the HVAC systems to make up the loss.

To reduce the likelihood of over or under-exhausting, systems have been developed which vary the motor speed between a minimum and a maximum speed in fixed relationship to the exhaust air temperature, as shown in U.S. Pat. Nos. 4,903,685 and 6,170,480, both assigned to the assignee hereof and both of which are incorporated herein by reference in their entireties. While those systems offer substantial improvements to commercial kitchen exhaust systems, further improvements are desired.

SUMMARY OF THE INVENTION

In those systems where the fan speed was varied in relation to exhaust temperature, for example, the relationship between that temperature and the fan speed could be seen as a fixed mathematical formula or as a single curve on a graph. I have discovered, however, that reliance on a fixed, single formula or single curve does not always provide optimal exhausting conditions. To this end, and in accordance with principles of the present invention, I have discovered that varying the formula or the curve (or by selecting from various formulae or curves) which defines the relationship by which fan speed is varied relative to exhaust temperature, can produce more optimal exhausting conditions within the facility. Advantageously, the relationship is varied in response to environmental parameters of the kitchen and/or ambient environment.

More specifically, past efforts involving variation in the fan speed were based on a fixed linear relationship between temperature and fan speed, for example. Thus, in prior systems, the fan speed would vary over a temperature span defined by a fixed minimum and a fixed maximum temperature In such systems, the fan speed is, thus, operated at a minimum rate if the exhaust air temperature is below a predetermined minimum temperature, is operated at a maximum rate when the exhaust temperature exceeds a predetermined maximum, and is otherwise operated at a speed correlated to the temperature. I have discovered that there are various conditions in which the typical temperature span is not sufficient to provide the most desirable results. Rather, by providing different temperature spans, i.e., different curves which define different relationships between fan speed and temperature, for example, the fan speed may be different for the same temperature depending on the applicable temperature span, to thereby reduce the incidence of over or under exhausting. The different temperature spans also allow the exhaust system to use the exhaust heat to warm the kitchen or facility during cooler weather or to assist the HVAC system with cooling the kitchen during warmer temperatures.

Other aspects of the present invention relate to further enhancements of a commercial kitchen exhaust system that determines which temperature span to use based on a number of different parameters. These parameters include such examples as whether the current temperature span results in the fan routinely operating at a speed above 90% (or some other threshold); whether the exhaust temperature routinely exceeds a predetermined temperature; whether operation at the current temperature span results in frequent, rapid rises in exhaust temperature through an operating day; and whether outside conditions can be used to effectively cool or heat the kitchen. With a number of different parameters available to effect the operating temperature span, different analyses based on these parameters may result in conflicting determinations about how to best change the operating temperature span. Accordingly, embodiments of the present invention advantageously include a "voting" system in which the different analyses are tallied to determine, by majority, how to change the operating temperature span temperature.

Other aspects of the present invention relate to monitoring the exhaust temperature to determine when to automatically turn the exhaust hood on or off. Further aspects relate to determining an optimal minimum speed at which to operate the exhaust fan. With the data available from the monitored parameters, other aspects of the present invention relate to automatically determining if the exhaust system is out of balance or whether the system's maximum fan speed is set to operate within its designed capacity. Yet a further aspect of the present invention relates to monitoring both the intensity and the duration of smoke within an exhaust hood to effect a change in fan speed regardless of the fan speed specified by the current temperature span and exhaust temperature.

By virtue of the foregoing, there is thus provided an exhaust system and method which provides for more optimal exhausting of a facility. These and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention, and together with the general description of the invention given above, and the detailed description of the embodiments given below, serve to explain the principles of the present invention.

BRIEF DESCRIPTION OF THE DRAWINGS

Figure 1A:
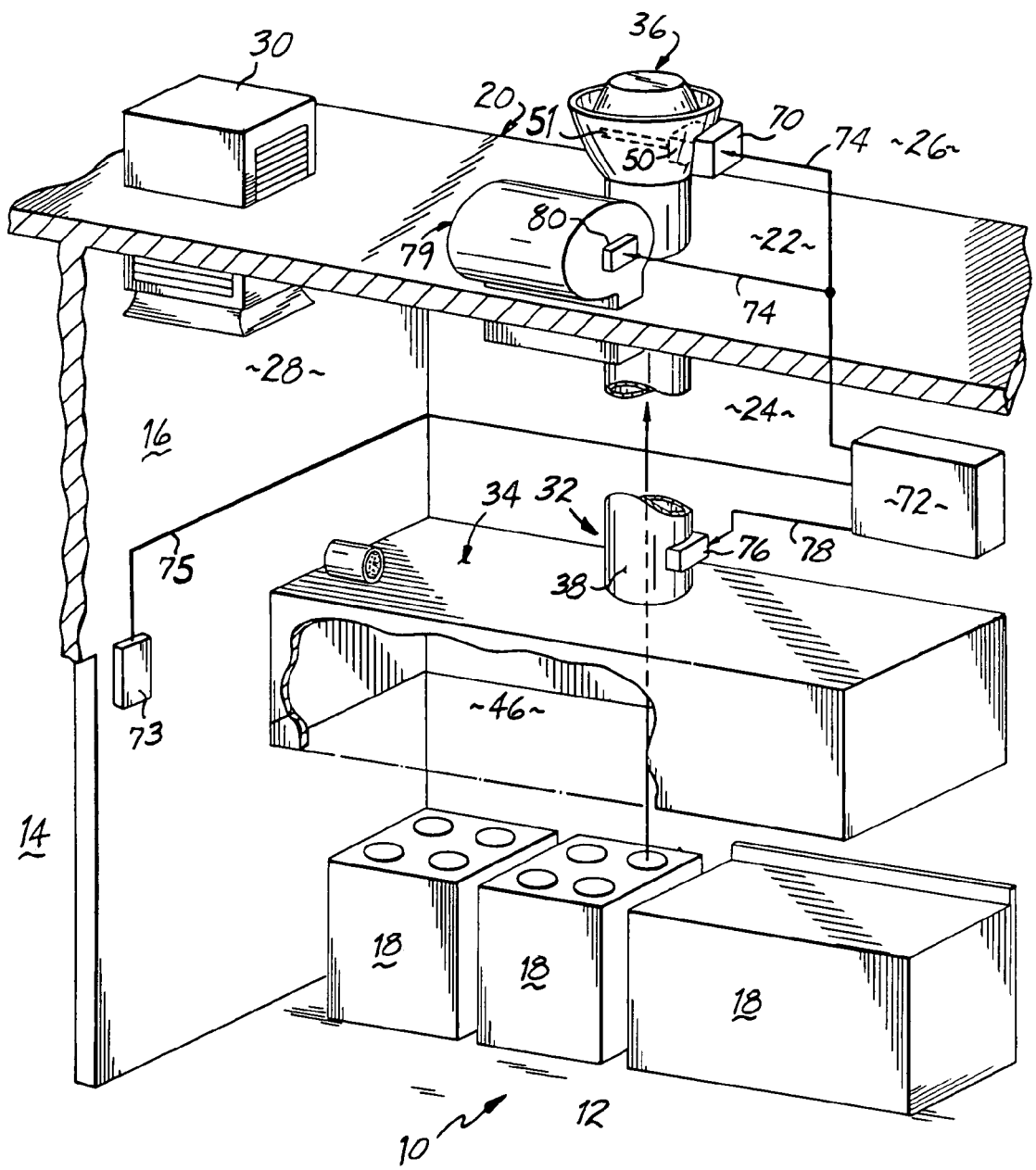

FIG. 1A is a perspective view diagrammatically illustrating a restaurant or institutional facility, primarily the kitchen area and cooking units thereof, including a kitchen exhaust system according to principles of the present invention.

Figure 1B:
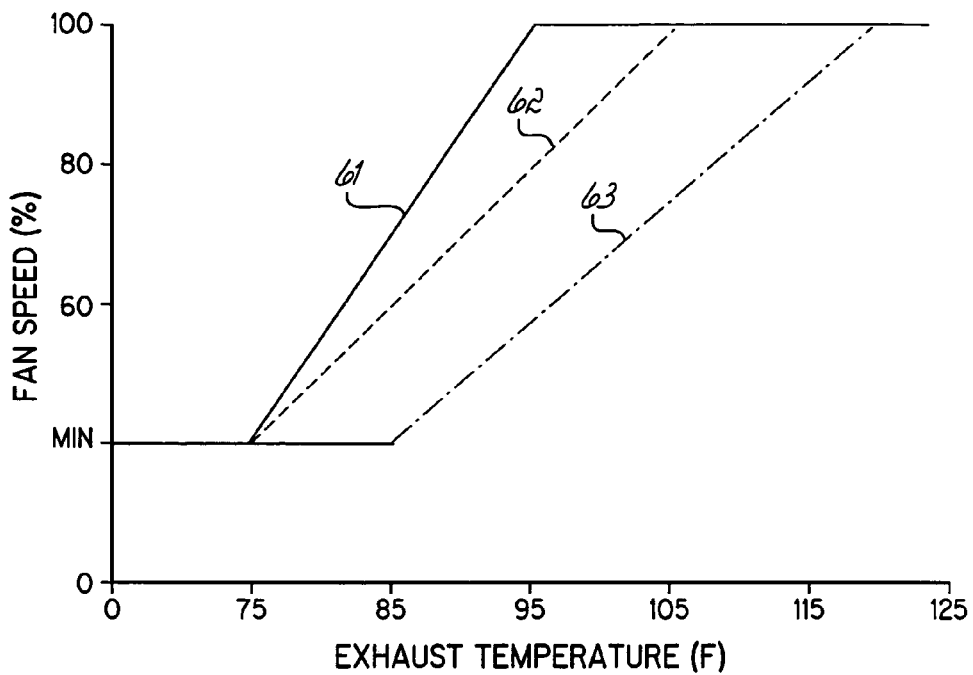

FIG. 1B is an exemplary depiction of multiple, different temperature spans over which exhaust fan speed may be modulated.

Figure 2:
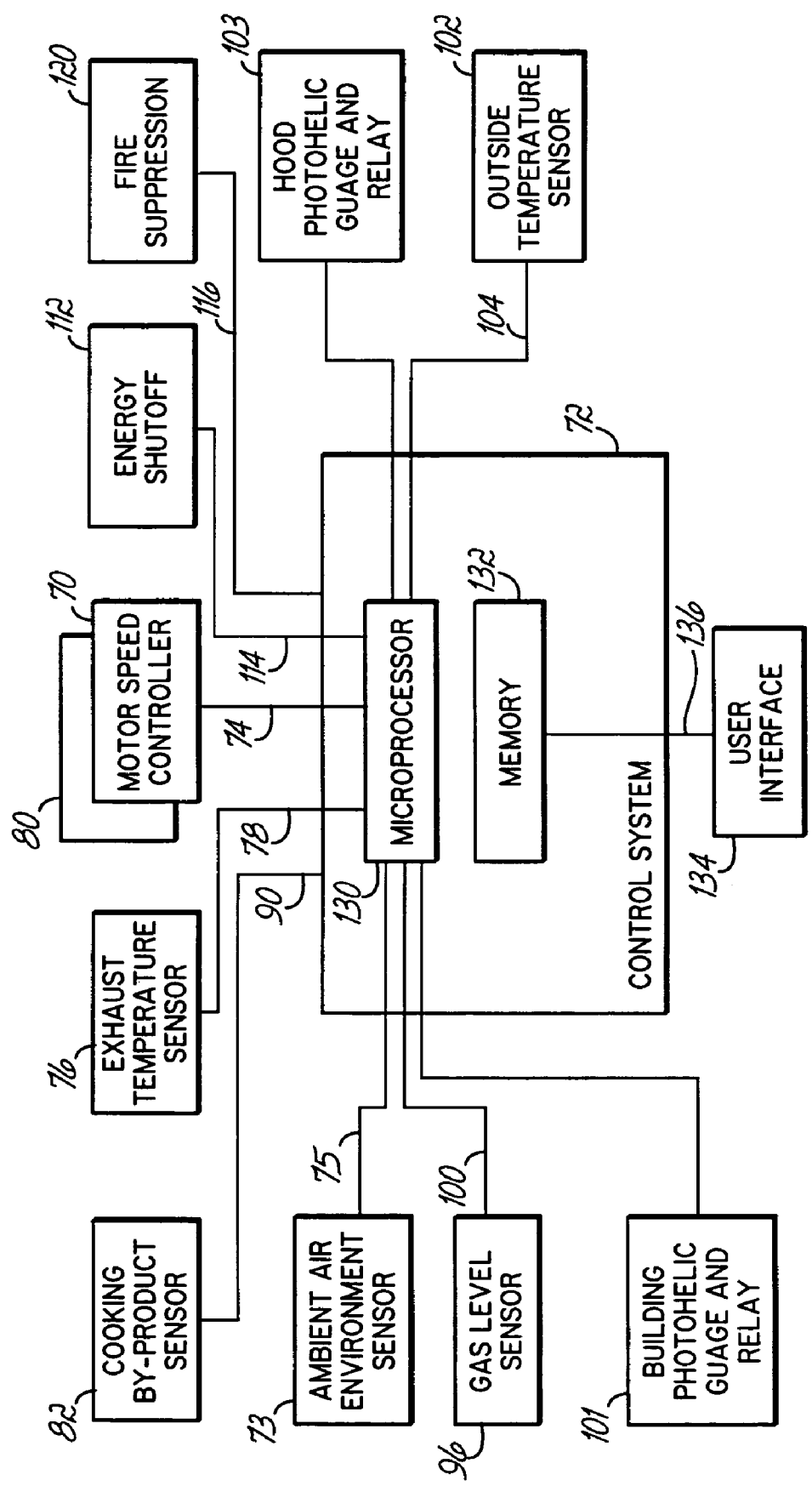

FIG. 2 is a block diagram of an exemplary exhaust system according to principles of the present invention.

Figure 3:
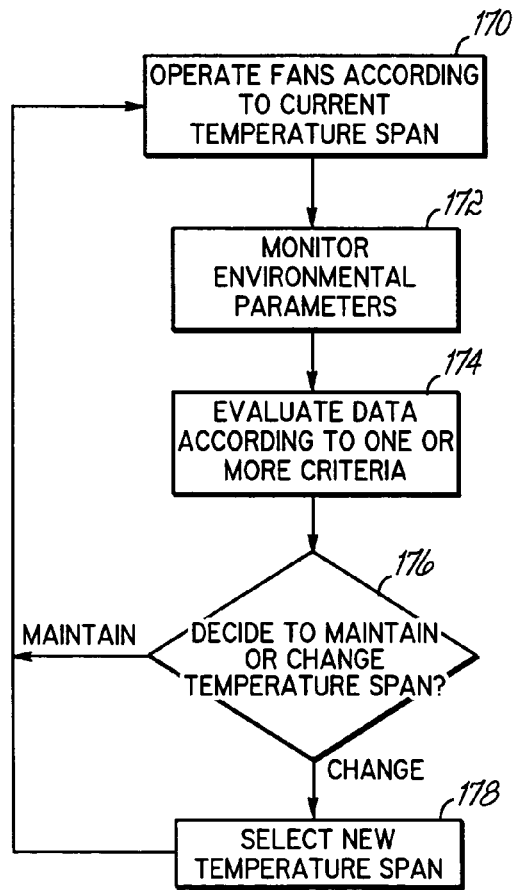

FIG. 3 is a flowchart of an exemplary control algorithm implemented by embodiments of the exhaust system of FIG. 2.

Figure 4:
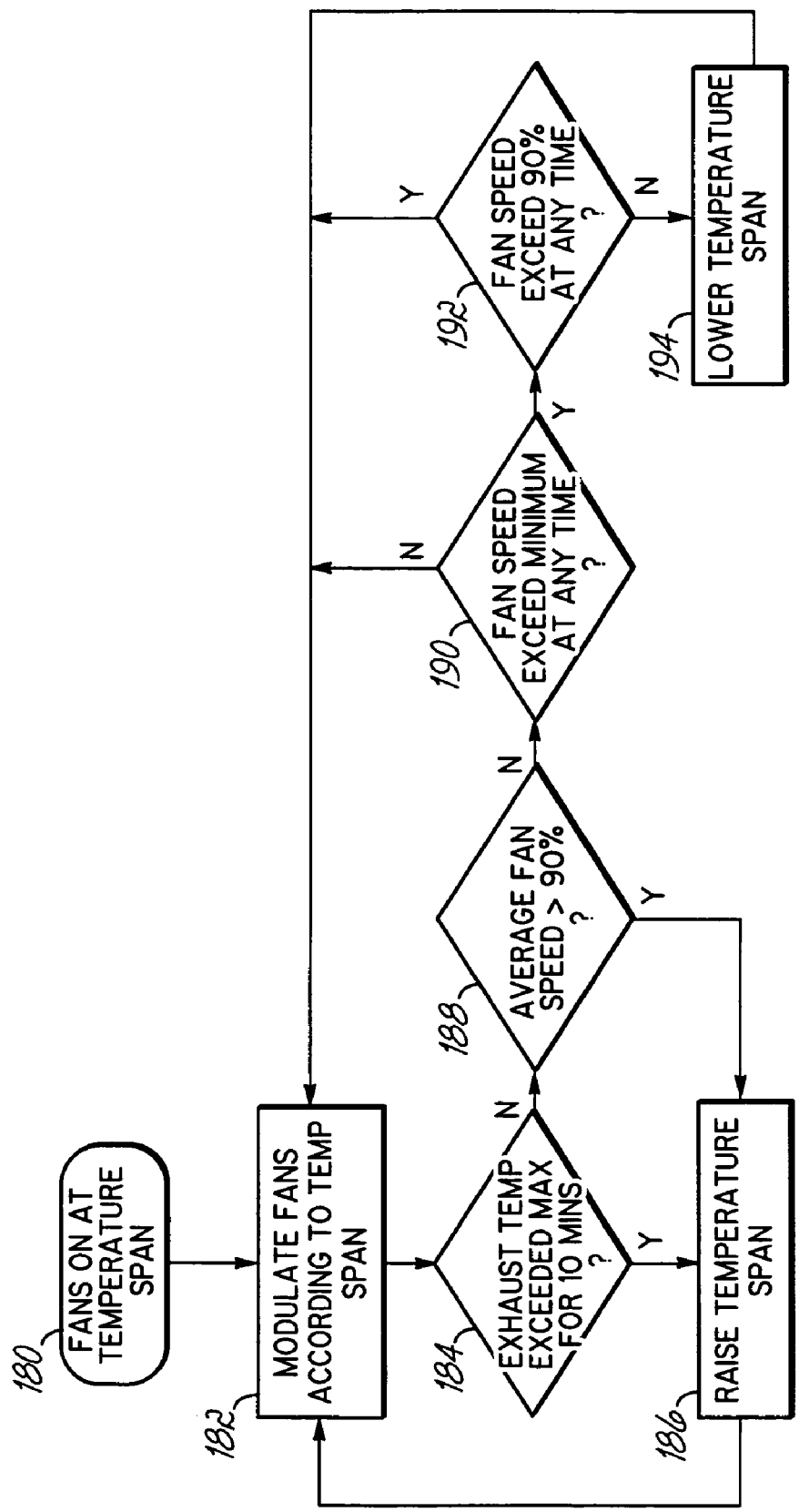

FIG. 4 is a flowchart of an exemplary algorithm for selecting an operating temperature span based on conditions within the environment of FIG. 1A.

Figure 5:
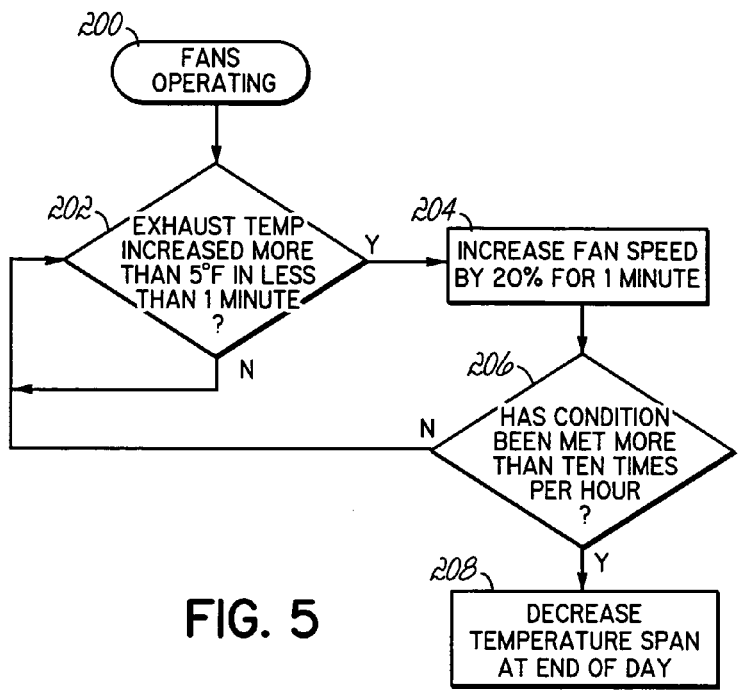

FIG. 5 is a flowchart of an exemplary algorithm for selecting an operating temperature span based on other conditions within the environment of FIG. 1A.

Figure 6:
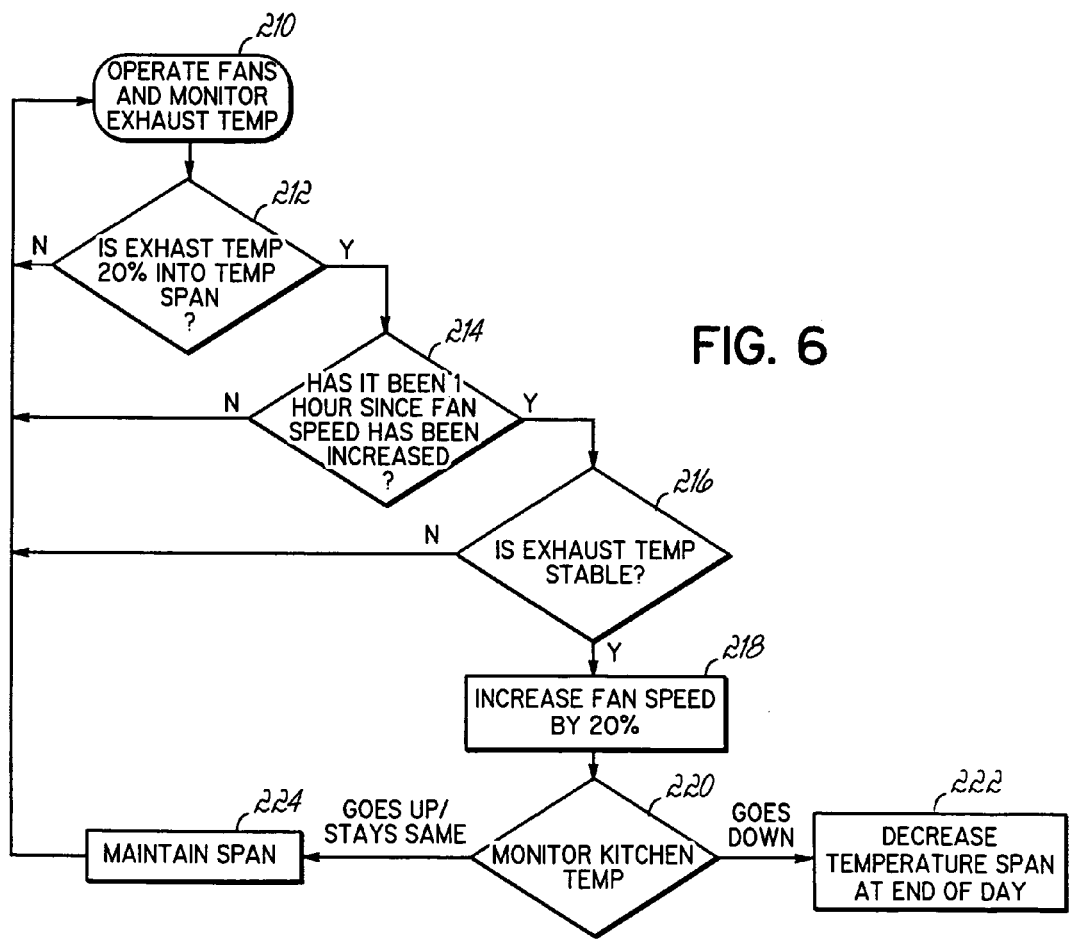

FIG. 6 is a flowchart of an exemplary algorithm for selecting an operating temperature span based on still further conditions within the environment of FIG. 1A.

Figure 7:
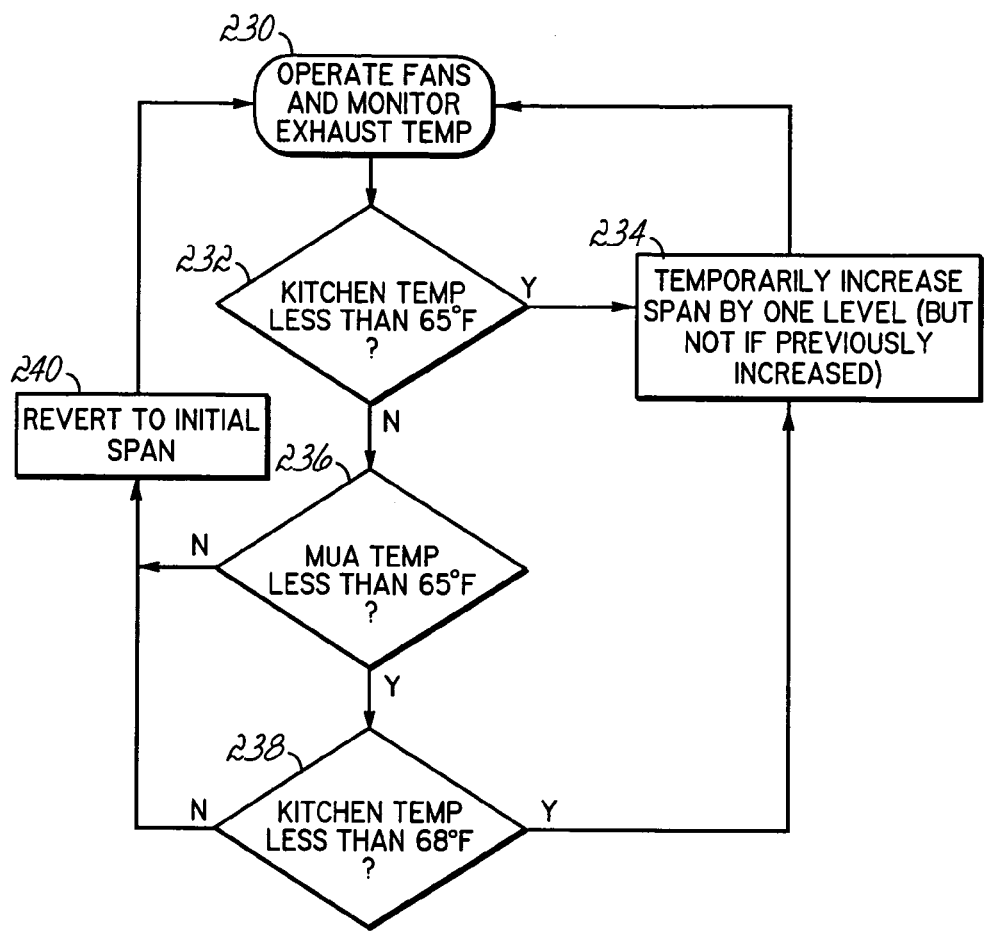

FIG. 7 is a flowchart of an exemplary algorithm for selecting an operating temperature span during cool weather.

Figure 8:
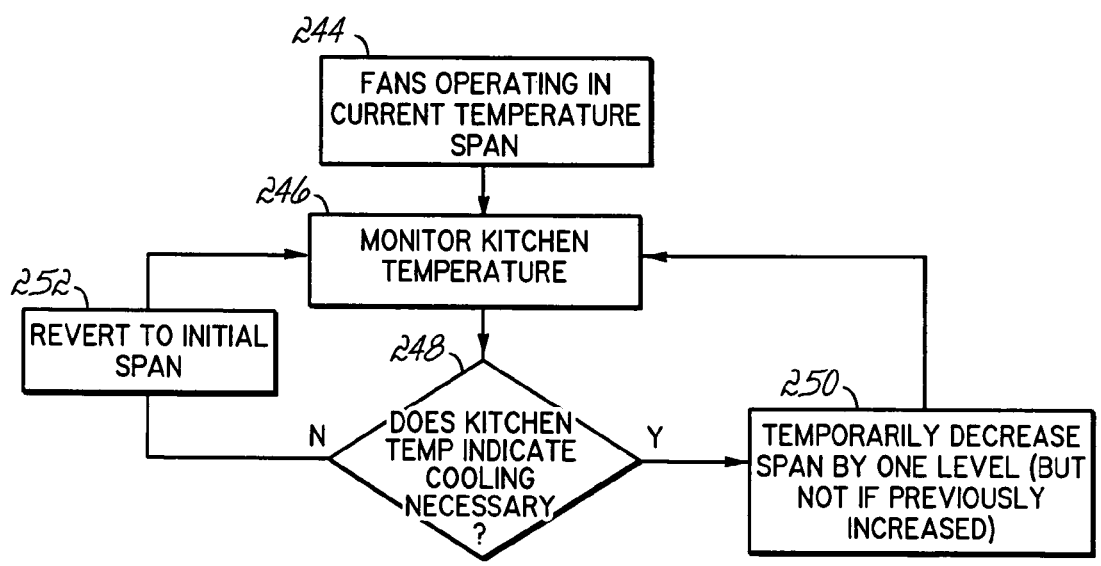

FIG. 8 is a flowchart of an exemplary algorithm for selecting an operating temperature span to connectively cool portions of the environment of FIG. 1A.

Figure 9:
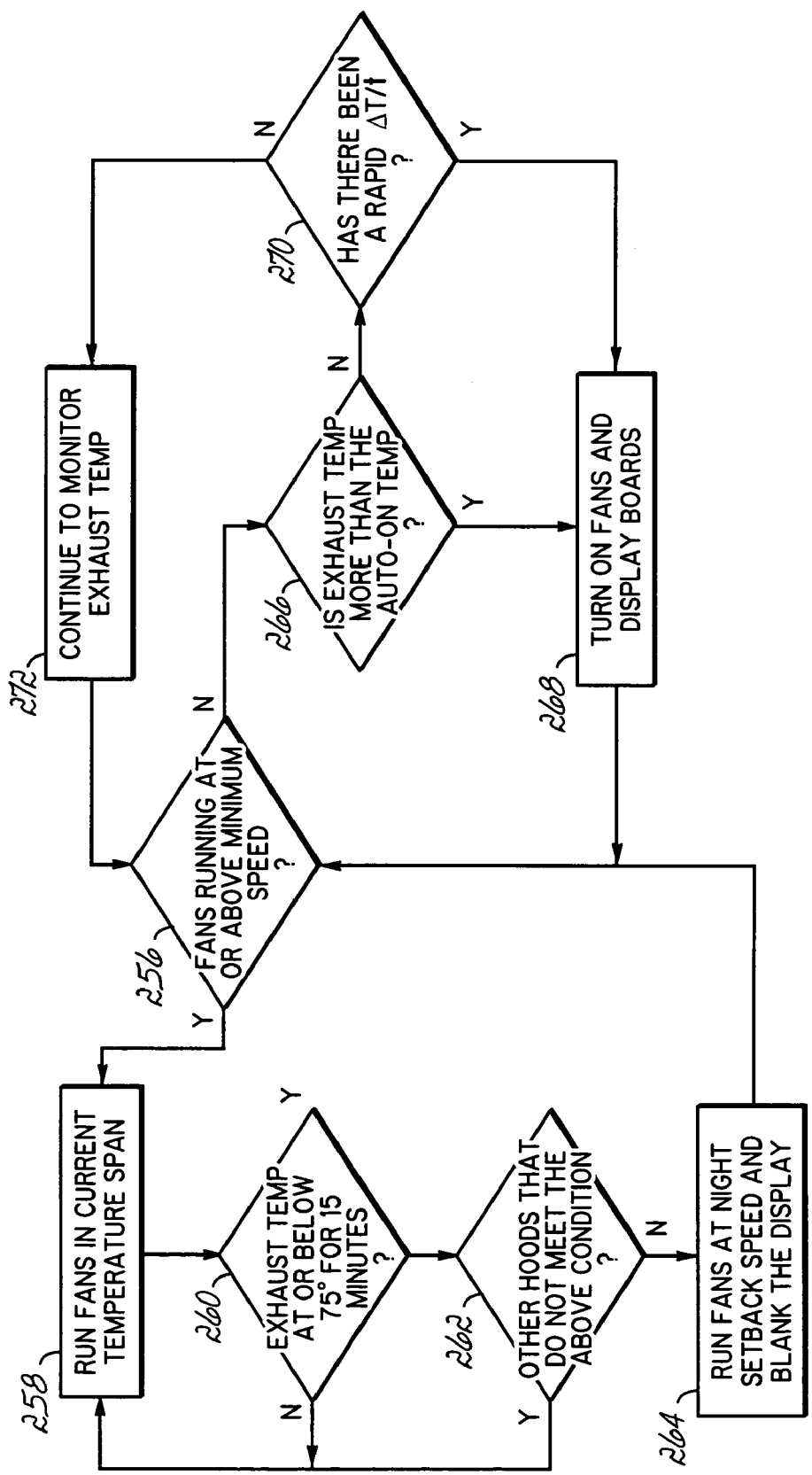

FIG. 9 is a flowchart of an exemplary algorithm for automatically turning on or off an exhaust hood according to principles of the present invention.

Figure 10:
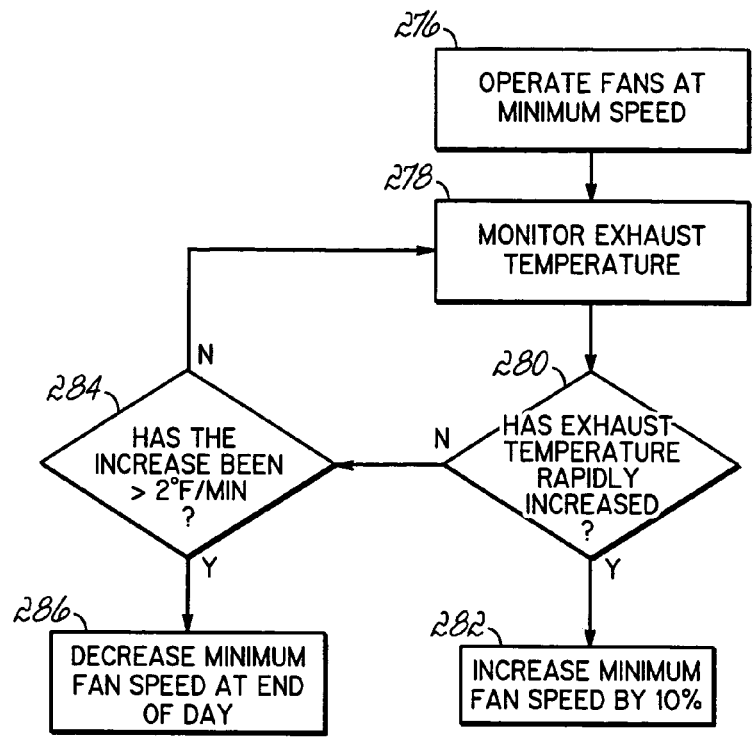

FIG. 10 is a flowchart of an exemplary algorithm for selecting a minimum fan speed according to embodiments of the present invention.

Figure 11:
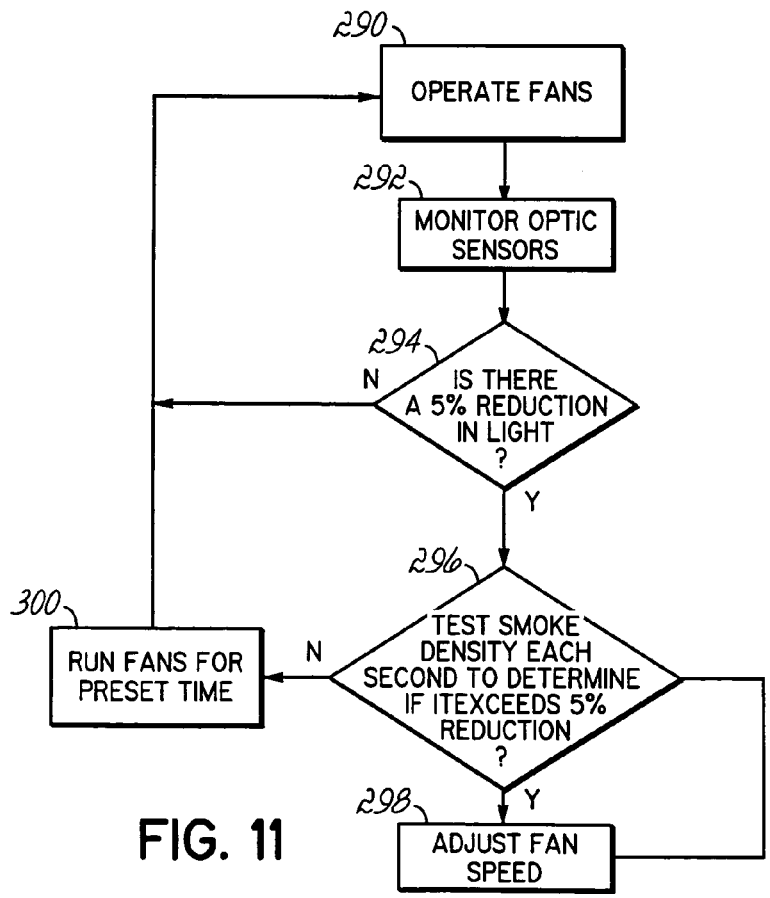

FIG. 11 is a flowchart of an exemplary algorithm for modulating exhaust fan speed based on smoke density within the exhaust hood.

Figure 12:
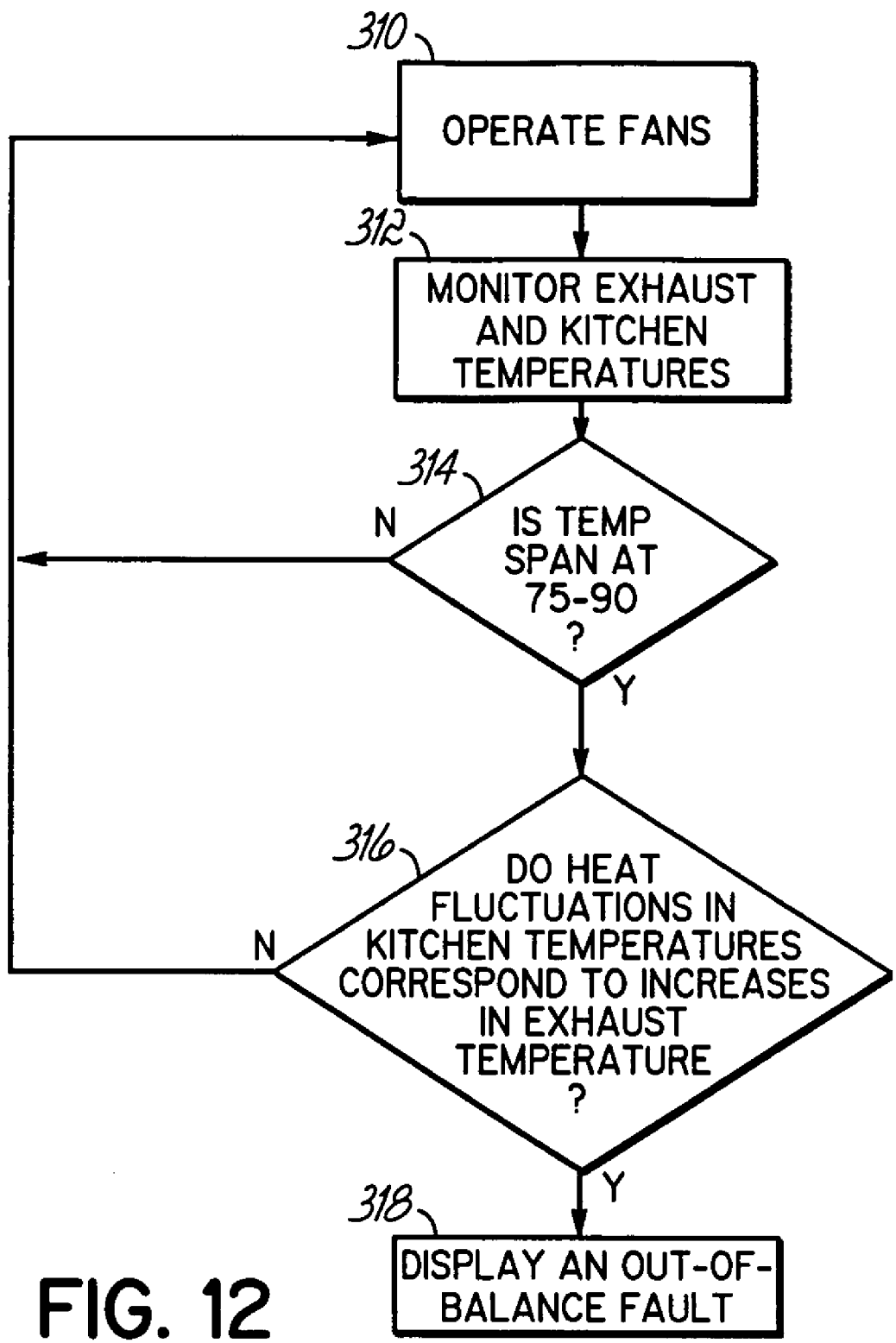

FIG. 12 is a flowchart of an exemplary algorithm for determining if an exhaust system is out of balance.

Figure 13:
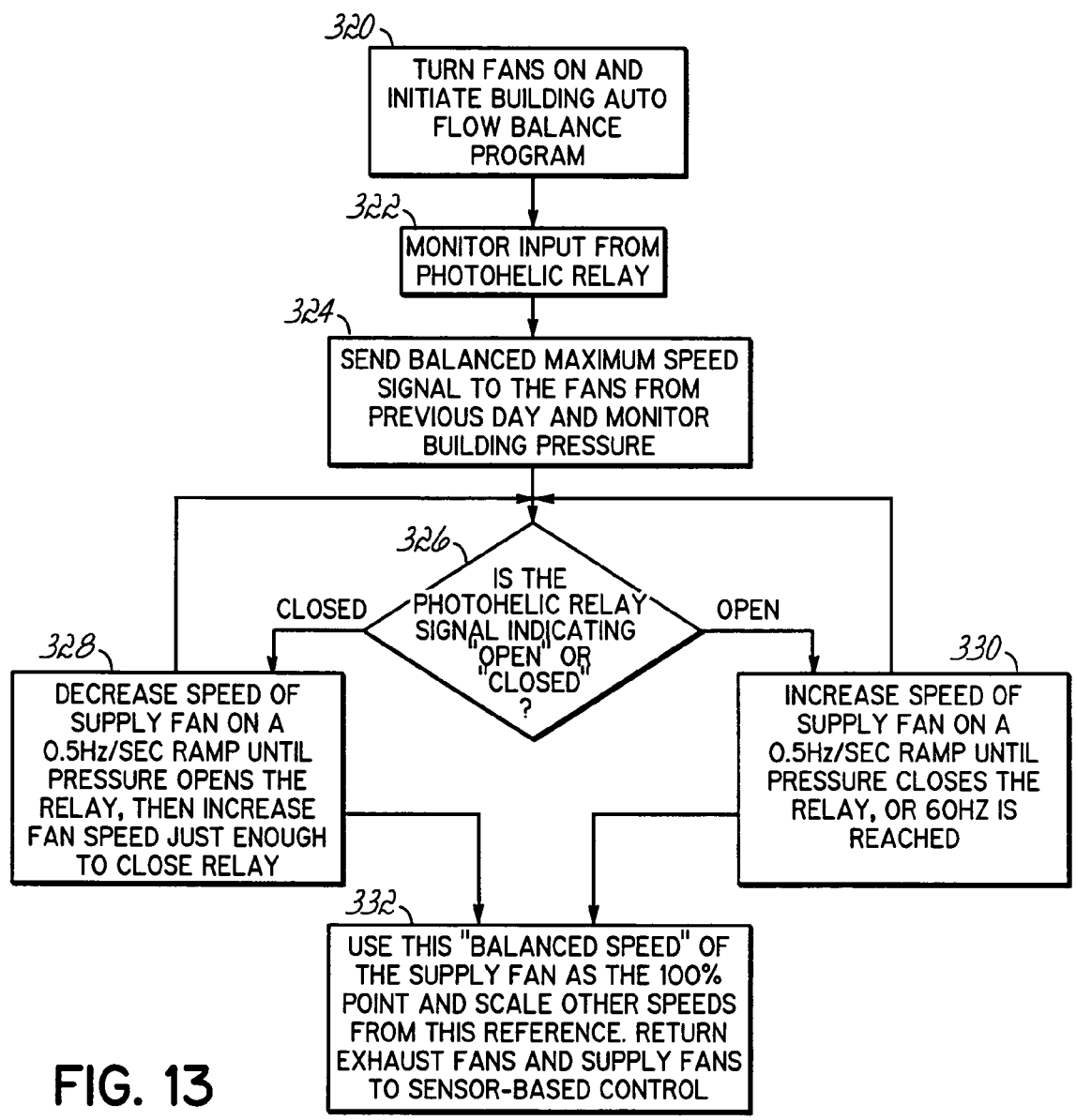

FIG. 13 is a flowchart of an exemplary algorithm for setting a maximum fan speed for an exhaust system based on a pressure differential between the kitchen and the outside.

Figure 14:
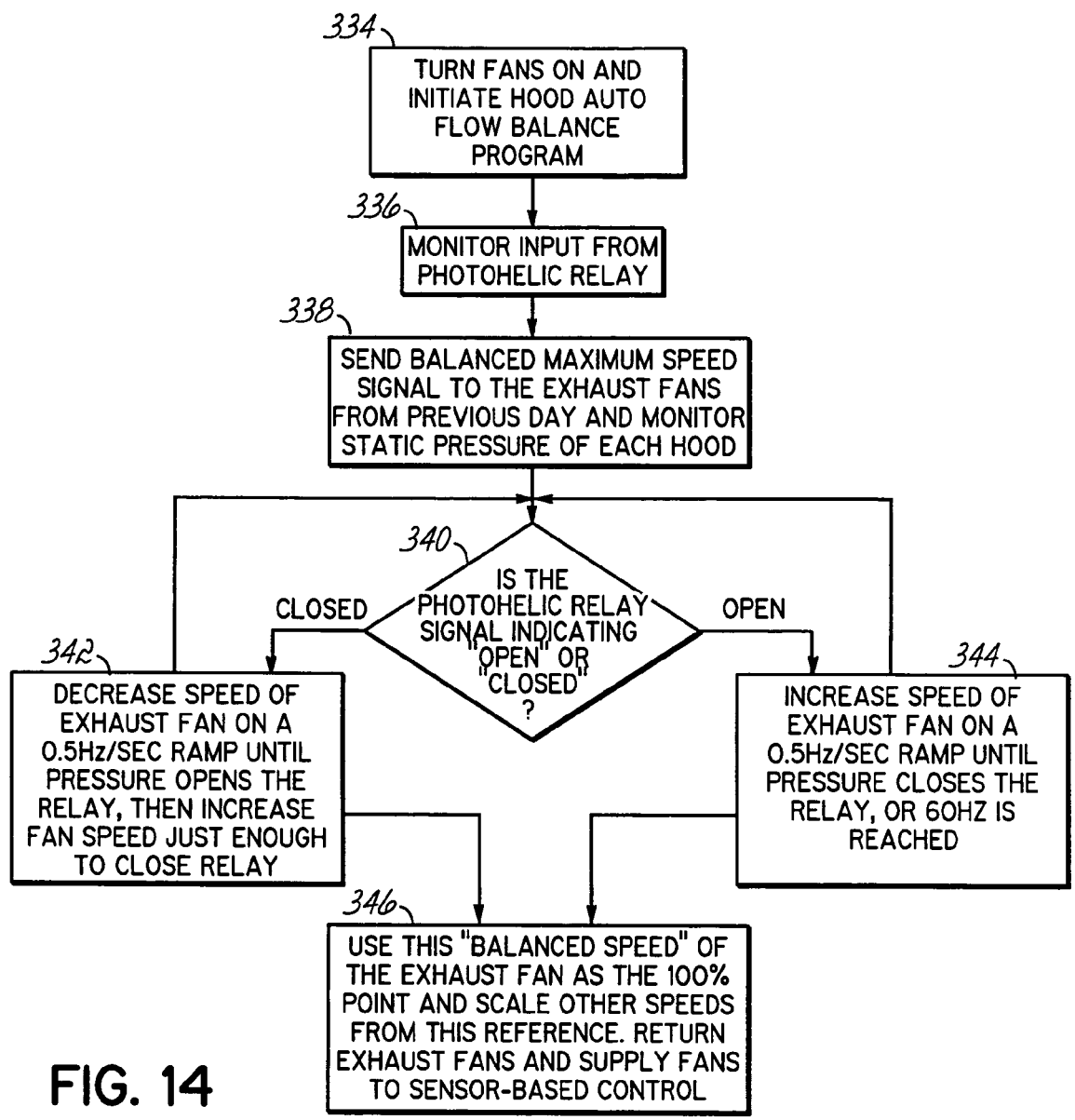

FIG. 14 is a flowchart of an exemplary algorithm for setting a maximum fan speed for an exhaust system based on a pressure differential between the inside of an exhaust hood and the environment outside of the exhaust hood.

DETAILED DESCRIPTION

Exemplary Exhaust System and Environment

Referring to FIG. 1A, a facility 10 such as a restaurant or institutional facility includes a kitchen 12 and at least one adjacent room such as a dining room 14 with an interior wall 16 separating the two rooms 12, 14. Kitchen 12 includes a plurality of commercial cooking units 18 such as one or more stoves, ovens, griddles and the like. The facility 10 is typically surrounded by an enclosure 20 (defined by a roof 22 and exterior walls 24 only one of which is shown in FIG. 1A) which separates the outside environment 26 from the inside ambient air environment 28 of facility 10 including kitchen 12. Facility 10 is also equipped with a heating, ventilating and air conditioning system ("HVAC") as at 30 which maintains the inside environment 28 at a suitable condition for the use of the occupants of facility 10.

Associated with kitchen 12 is kitchen exhaust system 32 including an exhaust hood 34 situated over the cooking units 18 and communicating with an exhaust assembly 36 through a duct 38. Hood 34 generally defines a volume 46 that communicates through a downwardly facing opening to cooking units 18 and also communicates with exhaust assembly 36 via exhaust duct 38. Exhaust duct 38 extends upwardly through the roof 22 of enclosure 20 and terminates in exhaust assembly 36 by which to exhaust air from volume 46 to the outside environment 26. Exhaust assembly 36 may include a fan motor 50 and associated fan 51 as is well understood by which to expel air from assembly 36 at a volume rate. Thus, when motor 50 is running, an air flow path is defined between cooking units 18 and outside environment 26. As air follows the air flow path, cooking heat and cooking by-products generated by the cooking units 18 are drawn along to be exhausted to the outside environment 26 rather than into the rest of the facility 10.

As will be explained in more detail below, a control system 72 controls the speed of the exhaust fan motor 50 according to a current operating temperature span and according to current environmental conditions. The control system 72 communicates with sensors 73, 76 over communication channels 75, 78 respectively and identifies operating conditions for the fan motor 50 and the fan 51 based on these environmental parameters. For example, sensor 73 is a temperature sensor for the ambient environment of the kitchen 12 and sensor 76 is a temperature sensor for the exhaust gasses exhausted from the hood 34. The illustrated sensors 73, 76 are exemplary in nature and other types of sensors as well as their respective locations are contemplated.

Facility 10 may advantageously include a make-up air system represented diagrammatically at 79 to bring air from the outside environment 26 to the ambient air environment 28 within kitchen 12 to compensate for the volume of air exhausted by the exhaust system 32. Make-up air system 79 may be adapted to provide air in the vicinity just outside of the hood 34 to reduce the amount of air exhausted that has been conditioned by the HVAC system 30. Alternatively, make-up air 79 may be introduced into other locations within kitchen 12 specifically, or facility 10 generally, as will be readily understood. The make-up air system 79 includes its own motor control 80 that communicates with the control system 72.

In accordance with principles of the present invention, the rate at which air is exhausted by the exhaust hood 34 is not simply limited to a fixed relationship with the exhaust temperature but, instead, is determined based on identifying one of a plurality of temperature spans (i.e., formulae, modifications to a formula, or curves) and then controlling the fan speed according to that temperature span. FIG. 1B depicts different temperature spans as curves on a graph. According to one embodiment of the present invention, the control system 72 selects, from stored memory, one of these temperature spans as the current operating span and then controls the exhaust fan speed accordingly.

One exemplary temperature span 61, over which embodiments of the present invention may control operation of the exhaust system 34, varies fan speed in a linear manner between 75° and 95°. More particularly, according to this temperature span 61, fan speed is at a minimum speed (e.g., 40%) when the exhaust temperature is at or below 75° and is at 100% when the temperature is at or above 95°. In between these two extreme temperatures, the fan speed varies linearly according to the temperature.

Referring to FIG. 1B, the temperature span 62 has the same minimum temperature (e.g., 75°) as span 61 but has a higher maximum temperature (e.g., 105°). Also, for example, the temperature span 63 includes a different minimum temperature and a different maximum temperature (e.g., 85° and 115°, respectively). As explained in more detail later, depending on different environmental parameters, the control system 72 may determine that one temperature span is a more optimal selection than another of the temperature spans and, therefore, change the current operating temperature span to the more optimal span. These are exemplary temperature spans and other, including, non-linear, temperature spans may be employed as will be appreciated by those skilled in the art.

With respect to temperature spans 61 and 62, a relationship can be defined wherein one temperature span is an "increase" or a "decrease" from the other. A such, later descriptions herein describe the control system 72 "increasing" or "decreasing" the current temperature span. An increase in temperature span is one which increases the maximum temperature and, conversely, a decrease is one which decreases the maximum temperature. Although minimum temperatures for the temperature spans can be adjusted as well, the minimum temperature is typically set at a point considered to be comfortable, such as 75° F. Accordingly, to move from temperature span 61 to span 62 is an "increase". The sloping portion of each span 61 and 62 can be characterized by a respective equation of the form $y=Ax+B$. Thus, to implement the different temperature spans, the control system 72 may store and retrieve the coefficients A and B for each temperature span or store the maximum temperature for a temperature span and calculate A and B accordingly.

As one of ordinary skill would recognize, the curves of FIG. 1B are exemplary representations of a temperature span. More generally, a temperature span is a relationship between exhaust temperature and exhaust fan speed wherein the exhaust fan speed varies according to that relationship. Thus, a temperature span as used herein may encompass any of a variety of formulae, functions or curves that are linear, non-linear, continuous, or non-continuous in nature.

FIG. 2 depicts a more detailed schematic view of the control system 72 and its interconnectivity with other aspects of the facility 10 and the exhaust system 32. To this end, a motor speed controller 70 is provided by which to vary the speed of motor 50 and thus its associated fan so as to vary the volume rate of air exhausted through exhaust assembly 36. Accordingly, the control system 72 is provided to couple volume rate signals over cable 74 to controller 70 by which to effect both the operating temperature span and the volume rate variations within that temperature span.

FIG. 1A depicts exemplary sensors 73 and 76 that monitor one or more environmental parameters in the kitchen 12, the ambient environment (e.g., 26 or 28), or the exhaust hood 34 and provide such data to the control system 72. Based, at least in part, on this data, the control system 72 determines the operating temperature span for the exhaust system 32. However, the sensors 73 and 76 are exemplary in nature, only, and FIG. 2 illustrates the variety of different sensors contemplated within the scope of the present invention. For example, a gas level sensor 96 and energy shut-off 112 may be present to provide safety features which are of benefit, for example, during an earthquake or other emergency. Also, a fire-suppression system 120 may be used to quickly squelch a fire under the hood 34. Furthermore, various pressure gauges 101, 103 and temperature sensors 102 may be located inside or outside of the kitchen 12 to provide the control system 72 with data about other environmental parameters. A more complete description of these sensors and their operation are provided in the previously incorporated patents.

With further reference to FIG. 2, it may be seen that control system 72 may include a microprocessor-based component or controller 130, such as a model 807C52 microprocessor manufactured by Intel, with associated memory 132 which receives the signals from the various sensors 73, 76, 96, 82, and 102 over cables 75, 78, 100, 90 and 104 and generates signals to the motor controller 70 (and 80) over cables 74 to achieve the above-described functions. By providing microprocessor capability in control module 72, the various functions of the exhaust system 32 may be adjusted and more reliably controlled. The control system 72, via a link 136, may also include visual (or audible) indicators (not shown) and a user interface 134 for use by kitchen personnel.

Control Algorithms

The above description of an exemplary exhaust hood control system is provided to lay the foundation for discussing the aspects and features of embodiments of the present invention. A more complete description of the operation and systems within the exhaust system of FIGS. 1A and 2 can be found in the aforementioned and incorporated U.S. patents. In general, however, in such a system, when the exhaust system 32 is first turned on, the exhaust fan 50 and make-up air fan may advantageously be set to start operating at a preselected minimum speed between 10% and 50% of a maximum rate. Alternatively, the fans can be briefly operated at 100%, to provide aural feedback to an operator that the fans are properly operating, and thereafter operated at the preselected minimum speed. As cooking takes place, the exhaust temperature within the hood 34 will likely increase. These increases are detected by the various sensors and, once some preset minimum exhaust temperature is reached, the speed of the fans is automatically increased, usually in proportion to the exhaust temperature according to the current operating temperature span. The speed continues to be increased until a maximum exhaust air temperature is reached, at which point, the speed is at 100% its maximum rate. Thus, there is a temperature span having a minimum temperature and a maximum temperature wherein the speed of the fans varies from a minimum rate (i.e., 10–50%) at the minimum temperature to a maximum rate (i.e., 100%) at the maximum temperature.

Variations of cooking schedules, outside temperatures and inside temperatures that occur throughout a particular day, throughout a given week, and over the different seasons of the year result in different temperature spans being optimal at different times. Accordingly, the computer control system 72 of the exhaust system 32 includes provisions for determining which of a plurality of different temperature spans is an optimal span over which to control the fan speed and, thus, the air exhaust rate of the hood 34. According to one embodiment, the optimal span is advantageously the one span which minimizes the energy consumed by operation of the hood 34 while maintaining comfortable conditions within the kitchen 12 or other space serviced by the hood 34.

The control system 72 monitors a number of parameters that provide information regarding which temperature span to use to control operation of the exhaust fan 51 (and, possibly, the makeup air fan 79). These parameters include, for example, the exhaust air temperature, the ambient kitchen temperature, and the outside temperature. Based on these parameters, the control system 72 adjusts the operating temperature span to effect different exhaust rates at a particular exhaust temperature within the exhaust system 32. This change can occur almost immediately after testing certain conditions related to the parameters or postponed until the next operating day. Also, the change could be temporary or remain in place until conditions dictate otherwise. The control system 72 can also determine, based on the parameters, that the current temperature span remains the optimal span and, therefore, effects no changes.

When the fans 51, 79 are first turned on, for an operating day, the control system 72 controls the fan speed and, thereby, the exhaust rate of the hood 34 according to a particular temperature span. For a newly installed system, a default temperature span is used for the first operating day. However, for a system that has been in operation, the selected temperature span may be a default span or, advantageously, be that which the control system 72 identified as the optimal temperature span during the previous operating day. During operation, the control system 72 monitors the conditions of the surrounding environment and modulates the fan speed according to the currently selected temperature span.

In addition to using the values of the monitored parameters to control the fan speed within the selected temperature span, the control system 72 also uses these values to evaluate the appropriateness of the currently selected temperature span and change it if necessary.

Temperature Span Selection

The flowchart of FIG. 3 illustrates a control method implemented by control system 72 to analyze the environment of facility 10 to determine whether the current temperature span over which the fans are operated is the optimal one. Thus, in step 170, the control system operates the exhaust, and possibly the make-up fan, at an appropriate speed as explained above. While, the fans are operating, the control system monitors one or more of the environmental parameters of the facility 10, in step 172. These parameters may include the outside temperature, the kitchen temperature, the exhaust air temperature, and the presence of cooking effluents. Furthermore, for these parameters, in addition to instantaneous monitoring, historical data can be gathered, stored, and analyzed by the control system 72.

In step 174, the control system 72 evaluates data about the monitored parameters according to one or more criteria. Although shown as a single block in the diagram of FIG. 3, the step 174 of evaluating the data can include a number of different tests conducted concurrently or sequentially. For each such test, the control system 72 determines in step 176, based on the test results whether the temperature span should be increased or decreased. Also, the outcomes of the different tests of step 174 may conflict with one another such that one test indicates the temperature span should be increased, while another test indicates that the temperature span should be decreased. Thus, when making the decision to change the temperature span, the control system 72 could handle such conflicting results by imposing a simple majority rule or could weight the different test results differently so that some test results have more effect on the decision of step 176 than others.

The control system 72 then changes the temperature span, in step 178, in accordance with the determination made in step 176. As explained in more detail below, the changing of temperature spans may occur almost instantaneously or can be delayed until the exhaust system 32 is turned-off and then back on.

The monitoring of environmental conditions of the surroundings (step 172) and subsequent analysis (step 174) performed by the control system 72 of the exhaust system 32 involves a wide variety of inputs and decisions. For example, the control system 72 may determine if, throughout the day, the exhaust temperature exceeded the temperature span's maximum temperature for a predetermined time period, or whether the average fan speed exceeded 90% during the operating day.

The flowchart of FIG. 4 depicts one exemplary method that the control system 72 could implement to perform the above-described analyses and evaluations. In step 180, the fans are turned on and begin operation within the currently set temperature span. During operation, the control system 72 modulates, in step 182, the fan speed according to the conditions of the kitchen 12 such as exhaust temperature and effluent levels.

In step 184, the control system 72 analyzes the exhaust temperature to determine if it has exceeded the maximum temperature for the current temperature span for a particular time period. For example, the control system 72 determines if the maximum temperature of the current temperature span has been exceeded by more than 5° F. for at least ten minutes. If so, then the control system 72 decides, in step 186, to raise the temperature span by one level.

If not, then the control system 72 might still decide that the temperature span should be changed if other criteria are met. In step 188, the control system determines if the average fan speed at the end of an operating day was more than a particular threshold such as, for example, 90%. If so, then the control system 72 returns to step 186 to decide to raise the temperature span. Advantageously, an operating day is one in which the exhaust hood has been turned on for at least 6 hours or some other predetermined time-period.

If the average fan speed did not exceed the threshold, then the control system 72 performs additional analysis such as determining, in step 190, if the minimum fan speed for the selected temperature span was exceeded during the operating day. If not, then the control system 72 decides that the temperature span should not change. If, however, the preset minimum speed was exceeded, then the control system 72 determines, in step 192, if the fan speed exceeded 90% at any time during the day. If so, then the full temperature span is being utilized and the control system decides the current temperature span is optimal. If not, then the control system decides, in step 194, that the temperature span should be changed to one having a lower maximum temperature in order to more fully utilize the entire temperature span.

In the method depicted in FIG. 4, the decision to change the temperature span may be made during, or at the end of, one operating day but be implemented during the next operating day. However, embodiments of the present invention contemplate implementing temperature span changes during the same operating day as well.

In addition to the criteria and determinations described above, a number of other operating parameters can be utilized by the control system 72 to decide whether the temperature span should be changed. The flowchart of FIG. 5, depicts an algorithm that investigates the change in exhaust temperature over time to determine if this data indicates a temperature span change is needed.

As described earlier, the fan speed is controlled, in step 200, according to exhaust temperature to vary between a minimum and maximum rate. During this operation, the control system 72 monitors the variation of exhaust temperature over time. If the control system determines, in step 202, that the exhaust temperature has increased by more than 5° F., for example, in the last minute, then the fan speed can be increased, in step 204. More particularly, if the fan speed is above 80%, then the fan speed is increased to 100%; otherwise, the fan speed is increased by 20%, in step 204. The duration of this increase is for a predetermined time period, such as one minute. Other times and temperature changes may be used as well.

The control system 72 monitors these temporary fan speed increases because each one indicates that the exhaust rate is insufficient to prevent relatively rapid increases in exhaust temperature. If the control system 72 determines that the fan speed is frequently increased, then a new temperature span should be selected. For example, if the control system 72 determines, in step 206, that in a one hour period the fan speed was temporarily increased at least 10 times, then the control system 72 decides, in step 208, that a different temperature span is needed having a lower maximum temperature. Alternatively, the control system 72 may average the data over the course of an entire operating day and make its decision, in step 206, based on whether the temporary fan speed increases averaged more than 10 per hour over the entire operating day.

Increases in temperature within the kitchen 12, or other space, serviced by the hood 34 can be caused by spilling or dumping. If all the heat caused by cooking is not sufficiently exhausted by the hood 34, then spilling occurs and the kitchen temperature increases. If the outside temperature is warmer than the desired temperature of the kitchen, then dumping can occur. Dumping conditions are caused by a exhaust fan speed that is too high. During dumping, even though all the heat from cooking is successfully removed by the hood 34, more makeup air is introduced into the kitchen 12 than can be handled by the air conditioning equipment 30 of the facility 10 housing the kitchen 12. Thus, when adjusting the temperature span to address increases in kitchen temperatures, the underlying cause of these increases is a factor to consider.

According to the flowchart of FIG. 6, an exemplary algorithm is provided for adjusting the operating temperature span of an exhaust hood 34. Similar to the previous techniques described, the control system 72 operates, in step 210, the fan speed according to a current temperature span and varies the speed according to the continuously monitored exhaust temperature. Next, in step 212, the control system 72 determines if the exhaust temperature is at least 20% more than the minimum temperature of the current temperature span. If not, then monitoring continues. If, however, the exhaust temperature is 20% into the temperature span, then the control system 72, in step 214, determines if either a) the fan has been operating for at least an hour or b) it has been an hour since this exemplary algorithm has increased the fan speed.

If either of the conditions in step 214 are satisfied, then the control system 72 analyzes the exhaust temperature, in step 216, to determine if it is stable. One exemplary test for stability is to determine if the temperature has not varied by $\mp 3°$ F. over a one-minute time period. If the exhaust temperature is stable, then the control system 72, in step 218, increases the fan speed by 20% (or to 100% if already operating above 80%) for a predetermined time period such as, for example, one minute. During and after the time period, the control system 72 monitors, in step 220, the kitchen temperature to determine if the temperature increases or decreases.

If the kitchen temperature increases, or stays the same, then increasing the fan speed caused dumping and the control system 72 decides, in step 224, to maintain the current temperature span. If, however, in response to the increased fan speed, the kitchen temperature decreases, then spilling was occurring prior to the speed increase and the control system 72 decides, in step 622, that a different temperature span is needed having a lower maximum temperature.

Many of the previous algorithms address the effects that different cooking activities can have on the appropriate temperature span to select. However, even if cooking schedules remain the same over the course of a year, the optimal temperature span might change because of the outside temperature fluctuations due to seasonal differences. For example, during the winter for a given exhaust temperature, the fan speed can be decreased (by increasing the temperature span) so that some convective heat spillage can occur and provide free heat to the kitchen 12. The control system 72, according to FIG. 7, operates the variable fan speed, in step 230, according to a current temperature span and monitors the environment 28. In particular, through this monitoring, the control system 72 can determine, in step 232, whether the kitchen temperature is less than 65° F. and, if so, changes, in step 234, the temperature span to one having a higher maximum temperature thereby slowing the fans and warming the kitchen 12.

If the kitchen temperature is 65° F. or more, then the air temperature from the make-up air unit 79 is tested, in step 236, to see if it is below 60° F. If so, then the control system 72 determines, in step 238, whether the kitchen temperature is less than 68° F. If so, the control system 72 changes the temperature span, in step 234, to one having a higher maximum temperature. However, if either the make-up air temperature is greater than or equal to 60° F., or the kitchen temperature is greater than or equal to 68° F., then the temperature span can remain the same, in step 240. As this algorithm occurs throughout the operating day, a subsequent execution may determine that the temperature span no longer needs to be elevated. Under these circumstances, the decision made at step 240 can result in the temperature span reverting to the initial temperature span for that operating day. The above threshold temperatures are exemplary in nature and other embodiments of the present invention contemplate use of alternative threshold temperatures.

According to one embodiment of the present invention, within the exemplary algorithm depicted in the flowchart of FIG. 7, step 234 is arranged so as to prevent increasing the temperature span by more than one level in a single operating day.

Conversely to the algorithm of FIG. 7, the fan speed can be increased for a particular exhaust temperature (by decreasing the temperature span) to effect convective cooling within the kitchen 12. FIG. 8 illustrates an exemplary algorithm the control system 72 may implement to achieve this result. During operation according to a current temperature span, in step 244, the control system 72 monitors, in step 246, the kitchen temperature to determine if it is too warm. For example, a kitchen temperature of 80° F. would be considered uncomfortable by many kitchen personnel and some type of cooling would be desired. Thus, if the kitchen temperature indicates, in step 248, cooling is needed, then the control system 72 decreases, in step 250, the temperature span by selecting a different temperature span having a lower maximum temperature. According to the exemplary algorithm of FIG. 8, the control system 72 is prevented from decreasing the temperature span by more than one level during a single operating day. Once the kitchen temperature has decreased to a more comfortable temperature, such as 75°, the control system can revert back, in step 252, to the original temperature span.

According to the previously described algorithms, the control system 72 may make a number of independent decisions about whether the temperature span should be changed or remain the same. In certain circumstances, the control system 72 may make conflicting determinations about how to change a temperature span. For example, one algorithm may indicate that the temperature span should be increased while another, different algorithm indicates that the temperature span should be decreased. To handle such possibilities, one exemplary method of organizing the control system 72 is to consider each different criterium-test performed by the control system 72 for changing temperature spans as being a vote. At the end of an operating day, the control system 72 determines, for each algorithm, whether it indicates no change to the temperature span, an increase to the temperature span, or a decrease to the temperature span. A simple majority of the votes dictates how the control system will change the temperature span for the next operating day. Alternatively, it is also contemplated that different algorithms could be given different weights so that one algorithm can have more effect on the outcome than some other algorithm or that one algorithm will over-ride another.

In addition to changing the temperature span for the next operating day, a change to the temperature span can be made almost immediately after detection of certain criteria by the control system. For example, the convective cooling algorithm described with respect to FIG. 8, or the winter setback algorithm described with respect to FIG. 7, may be implemented such that the control system 72 overrides the current temperature span by immediately increasing or decreasing the temperature span as indicated by the kitchen conditions. This override could be temporary until kitchen conditions indicate otherwise, could be temporary for a predetermined time period, could be for the remainder of the operating day, or could change the preset temperature span stored in the control system so that it is used to begin operation the next day.

Automatic On/Off

Typically, an exhaust hood 34 as described herein relies on kitchen personnel to manually power it on or off. However, the control system 72 and sensors can automatically control the on/off operation of such an exhaust hood 34 by following the exemplary flowchart depicted in FIG. 9.

According to the exemplary flowchart, the control system 72 determines in step 256, if the fans 51, 79 are running above the preset minimum speed. If they are, then their speed is controlled, in step 258, according to the exhaust temperature or other monitored conditions as previously described. Furthermore, the control system 72 checks, in step 260, whether the exhaust temperature has been below a particular minimum value for a predetermined time period likely indicating that cooking is not taking place. For example, the control system 72 could determine if the exhaust temperature has been below 75° F. for at least the last 15 minutes.

Once the exhaust temperature satisfies the test of step 260, any other connected exhaust hoods are tested in step 262, if there are multiple hoods present. Once all the hoods satisfy the test of step 260, the fans are operated, in step 264, at their programmed speed at night. This night-time speed can be between 0% (i.e., "off") or a value such as 20% that consumes little energy. Additionally, any displays or indicators associated with the hood 34 are deactivated as well, in step 264.

An alternative outcome to step 256 would be that the control system 72 determines the fans are not running at the minimum speed. In this instance, the control system checks, in step 266, if a "turn-on" temperature threshold, such as 90° F., has been exceeded. If it has, then the control system 72 turns the fans on at the minimum speed, in step 268, and afterwards modulates the fan speed according to the sensed conditions (step 258).

Even if the turn-on temperature has not been exceeded, the control system 72 may still check, in step 270, whether the exhaust temperature is rapidly increasing. If so, then the fans can be turned-on in step 268. One exemplary indication of rapidly increasing temperature is whether the increase in exhaust temperature exceeds 5° F. over the last minute. However, other temperature deltas and time periods are contemplated as well. If a rapid temperature increase has not been detected, the control system 72 continues to monitor, in step 272, the exhaust temperature in order to determine when to turn on the fans.

Minimum Speed Selection

In addition to identifying an optimal temperature span from among a plurality of temperature spans, the control system 72 can also adjust the minimum speed associated with the temperature span's minimum temperature. As described earlier, the control system 72 varies the fan speed, during operation, from a minimum speed to a maximum speed based on monitored conditions, typically, although not necessarily, in a linear manner. Thus, by increasing the minimum speed, the fan effectively operates at a higher speed along the entire temperature span.

The flowchart of FIG. 10 depicts an exemplary algorithm that can be implemented by the control system 72 to automatically determine if the minimum fan speed should be increased. The fans are operated, in step 276, at the programmed minimum speed upon being powered-up. For example, this speed could be 20%. Next, in step 278, the exhaust temperature is monitored so that the control system 72 can determines, in step 280, whether there has been a rapid increase in exhaust temperature. The control system 72 may make this determination as the conditions are being monitored or merely collect the data over the course of an operating day and then perform the analysis of this data at the end of the day.

If there has been a rapid increase in exhaust temperature during the operating day, the control system increases, in step 282, the programmed minimum speed by some amount such as, for example, 10% for the next operating day. This increase can be limited by some maximum value so that the minimum speed is never allowed to be greater than, for example, 50% regardless of the outcome of step 280.

If, in step 280, the increase in exhaust temperature did not exceed the threshold for "rapid", then the historical data for the operating day is analyzed in step 284. In particular, the control system 72 determines if, during the operating day, the exhaust temperature increased at a rate, for example, greater than 2° F./minute. If not, then the temperature variations during the operating day appear to be normal and no changes to the temperature span are warranted. If however, the temperature increases experienced during the day were above the 2° F./minute criteria of step 284, then the control system 72 decides, in step 286, to decrease the minimum speed by a predetermined amount such as 10% at the end of the operating day. The step 286 may be limited so that it never results in the minimum speed being decreased below a minimum value such as 10%.

Smoke Density

In addition to the different temperature data monitored, smoke density within the exhaust hood 34 may possibly indicate to the control system 72 when fan speed should be modulated. Referring back to FIGS. 1A and 2, an optical sensor 82 is typically connected with the control system 72 to detect the presence of smoke within the exhaust hood 34. As explained in more detail within the aforementioned and incorporated patents, the sensor 82 is calibrated for an amount of light transmitted from a light source along a clear air path and detects the amount of light reduction caused by the presence of smoke within the exhaust hood 34.

FIG. 11 illustrates an exemplary algorithm by which the control system 72 can adjust the fan speed based on the presence of smoke even if the temperature data does not indicate that the fan speed should be adjusted. In accordance with this algorithm, the fans are operated, in step 290, based on the exhaust temperature and the current operating temperature span, as described earlier. In step 292, the control system 72 monitors the optic sensor 82 within the exhaust hood 34 to determine if it indicates the presence of smoke. The control system 72 determines, in step 294, whether the sensor 82 indicates that there has been a noticeable reduction in the transmitted light. For example, a 5% reduction is one possible threshold at which to decide that corrective action is necessary. Otherwise, the control system 72 continues to monitor the sensor 82, in step 292.

In step 296, the control system 72 tests the smoke density a second time approximately one second after step 294 indicates smoke is present. By performing step 296 in this manner, the control system 72 can determine if the presence of smoke still exists and, further, it will recognize how long the smoke has been present. If smoke is still present, then the control system 72 adjusts the fan speed in step 298. If no smoke is present, then the smoke has dissipated and control of the fan speed by the control system 72 can once again be based on exhaust air temperature. However, as a precaution, the fans are operated at their current speed, in step 300, for a preset time period to ensure all the smoke has been successfully dissipated. An exemplary time period is one minute but the fans could be operated in this manner for a period ranging from a few seconds to over a minute.

The adjusting of the fan speed, in step 298, is performed in accordance with the following table:

| Elapsed Time | ≧5% | ≧7% | ≧9% |
|---|---|---|---|
| 1 s | 60% | 80% | 100% |
| 2 s | 80% | 100% | 100% |
| 3 s | 100% | 100% | 100% |

If the desired fan speed, determined according to one of the exhaust temperature control algorithms, is greater than an entry within the above table, this smoke density control algorithm will not decrease the fan speed as doing so would worsen the conditions in the exhaust hood.

If, upon reaching step 296 the first time, the control system 72 detects that the light reduction remains greater than 5%, then a fan speed is selected from the first row of the table based on the detected percentage of light reduction. After adjusting the fan speed in step 298, the control system 72 returns to step 296 and by now two seconds have elapsed. If the light reduction remains greater than 5%, then a fan speed is selected from the second row of the table. If the smoke has dissipated, however, the control system 72 operates the fans according to step 300 as explained above.

If the control system 72 returns once again to step 296, three seconds have elapsed and if the smoke persists, then a fan speed is selected from the third row of the table. Once step 296 is performed three times, the fan speed is at 100% regardless of the exact amount of light reduction detected. Thus, step 296 can be repeated over and over again until the smoke dissipates and control passes to step 300 but on these subsequent iterations, no new speed is selected from the table as the fans are already being operated at their maximum speed. Thus, both the duration and intensity of the smoke within the hood 34 is used to select a fan speed to help dissipate the smoke.

Exhaust Hood Out of Balance

There may be instances in which the exhaust hood 34 operates at the lowest temperature span (e.g., 75° F.–90° F.) and is still unable to effectively cool the kitchen 12. Under these circumstances, the hood 34 is considered to be out of balance and the operator of the kitchen will need to use higher capacity motors and/or fans. The control system 72 can alert an operator to this condition by implementing the exemplary algorithm depicted in the flowchart of FIG. 12.

According to this flowchart, the control system 72 operates and controls, in step 310, the fans as described previously. The control system 72, in step 312, monitors the kitchen temperature as well as the exhaust temperature so that a determination may be made about the effectiveness of the exhaust system 32. In step 314, the control system 72 determines if the current temperature span is at the lowest level (i.e., has the lowest maximum temperature). If not, then no conclusions are made regarding the adequacy of the hood 34. If, however, the temperature span is at the lowest level, then the control system 72 will analyze the data from step 314 to see if temperature fluctuations in these parameters occur concurrently. For example, the control system 72 determines, in step 316, if temperature fluctuations in the kitchen 12 occur frequently, such as an increase of 5° F. in less than a minute occurring at least five times within one hour. The control system 72 also determines, if during these fluctuations, whether the exhaust temperature was increasing as well. If there are no exhaust temperature fluctuations or there is no correlation between the data, then the control system 72 continues to monitor, in step 312, the temperature of the kitchen 12 and exhaust hood 34.

If, however, there are temperature fluctuations in both the kitchen temperature and the exhaust temperature and there is a correlation between the two data, then the cooking heat is likely spilling into the kitchen 12 because the hood is inadequate to fully capture it. In response, the control system 72 provides, in step 318, an alert, or indicator, to an operator of this condition. Thus, when the exhaust system 32 is operating at the lowest temperature span and the control system 72 determines that exhaust heating results in kitchen heating, then the kitchen operator is notified that the hood, or hoods, are out of balance.

Air Balance

Before installing an exhaust system 32 such as that depicted in FIG. 1A, a number of parameters are analyzed in order to design the system so that it is capable of performing in its intended environment. For example, the size of the exhaust hood 34 and the capacity of the fans 51, 79 are both design characteristics that are decided beforehand. In particular, analysis of the intended environment includes determining what pressure difference between the inside of the exhaust hood 34 and the outside of the exhaust hood will result in adequate performance that keeps the facility comfortable. Therefore, when installed, the exhaust fan 51 needs to be capable of operating at a maximum speed which results in that pressure differential and, in addition, the exhaust fan 50 should not unnecessarily expend power by operating above that maximum speed.

As described herein, instead of specifying the fan speed as an absolute value such as 200 revolutions per minute (RPMs), fan speed has been referred to as a ratio such as 50% or 90%. This ratio is more precisely the ratio of a particular fan speed as compared to the maximum fan speed for a particular exhaust hood application. Thus, when the control system 72 is modulating the fan speed to a value such as 20% or 80%, it is using a pre-stored value of the maximum fan speed to do so. The maximum fan speed usually occurs when the control signal modulates the fan speed between 50 Hz and 60 Hz. By increasing the frequency sent to the motor control 70 (or 80), for example to 60 Hz, the control system 72 will cause an increase in the fan speed and by decreasing the frequency towards 50 Hz, the fan speed will decrease.

Once an exhaust hood 34 is installed at a particular location 10, some of the pre-programmed control parameters may need to be modified because the "real-world" exhaust system does not behave exactly as expected. Also, as equipment ages and wears, the original control parameters may no longer be at optimal values. One such parameter is the maximum speed for the exhaust fan and another such parameter is the maximum speed for the makeup air unit 79.

FIG. 13 depicts an algorithm for an exemplary method of using pressure differential measurements to set an maximum fan speed. This algorithm can be performed upon initial installation of an exhaust system 32 and periodically over its life. In step 320, the control system 72 operates the fans before initiation of an auto-balance routine as described below. As described with respect to FIG. 2, a differential pressure gauge 101 can be positioned so as to sense the difference in pressure between the outside 26 of the kitchen 12 and the inside 28. Furthermore, this gauge 101 includes a relay that changes state when a threshold difference is exceeded. Although one of ordinary skill would readily recognize alternative techniques for detecting when a differential pressure exceeds a threshold, the Photohelic® gauge and relay manufactured by Tierra Universal, Inc. is an exemplary simple technique for doing so. Thus, in step 322, the control system 72 monitors the gauge and relay 101 to detect its condition. Also, in step 324, a previously determined maximum speed signal is sent to the fans so that they operate at 100% speed. The control system 72 retains this information from previous operating days; however, if no maximum speed data is present, then the control system can start at a minimum threshold such as 50 Hz. In step 326, the control system 72 determines whether the gauge and relay 101 indicate that the relay is open or closed. If the relay is open, then the pressure within the kitchen 12 is too low and the make up unit 79 fan speed should be increased. However, instead of rapidly increasing the fan speed, the exemplary algorithm, in step 330, ramps the control signal slowly by, for example, +0.5 Hz/sec. As the fan speed is being increased, the control system 72 continues to monitor the gauge and relay 101 in step 326 to determine when it closes. The value of the control signal in step 330 that results in the gauge and relay 101 closing becomes, in step 332, the "maximum speed" used by the control system 72 when setting fan speeds. The control system 72, thus, stores this value in its memory 132.

If, however, the gauge and relay 101 originally indicated that the relay was closed, then the pressure within the kitchen 12 is too high and the fan speed should be decreased. The control system 72 slowly decreases, in step 328, the modulating control signal to the motor controller 80 by ramping down at −0.5 Hz/sec. When the control system 72 detects that the speed has been decreased enough to open the gauge and relay 101, then the fan speed is increased slowly (as in step 330) until the gauge and relay 101 once again closes. The value of the control signal in step 328 that results in the gauge and relay 101 closing becomes, in step 332, the "maximum speed" used by the control system 72 when setting fan speeds. The control system 72, thus, stores this value in its memory 132.

In exemplary embodiments of the present invention, the modulating control signal is not decreased lower than 50 Hz in step 328, nor increased past 60 Hz in step 330. The specific actions described above with respect to the gauge and relay 101 being opened or closed can be alternatively performed. For example, the gauge and relay acts as a binary logic device, whether it is specifically the "open" or "closed" state that is associated with too little or too much pressure is immaterial to the scope of the present invention. The gauge and relay 101 provide a input to the control system 72 by which it can determine whether a maximum fan speed should be increased or should be decreased based on differential pressure data between the inside and outside of the building.

A similar algorithm can be implemented with the exhaust fan speed, as shown in FIG. 14. However, in this instance, the pressure differential of interest would be that between inside the exhaust hood 34 and the outside of the exhaust hood 34 and, thus, a gauge and relay 103 would be located to detect and indicate a pressure differential between these two areas. The steps 334–346 of this algorithm are similar to those of FIG. 13 and will not be discussed in as much detail. In summary, the control system 72 determines, in step 340, whether the fan speed of the exhaust fan should be increased, in step 344, or decreased, in step 342, based on the state of the gauge and relay 103. Once, the modulating control signal to the controller 70 of the exhaust fan 51 is changed to result in the pressure differential matching the design parameters of the hood 34, then this value of the control signal is stored, in step 346, in the memory 132 of the control system 72. The control system 72, then uses this value as the 100% reference when setting the fan speed according to the other control algorithms described herein.

In use, embodiments of the present invention in its broader aspects are not limited to the specific details, representative apparatus and methods, and illustrative examples shown an described. Accordingly, departure may be made from such details without departing from the spirit or scope of applicant's general inventive concept. For example, in its broadest sense, changing a temperature span results in changing the fan speed at a particular temperature between the two different spans. Thus, different temperature spans do not necessarily require different minimum and/or maximum temperatures. This is merely one way of accomplishing fan speed changes by linearly changing the fan speed according to temperature. Alternatively, operating the fan speed according to one of many different non-linear variations of fan speed across a temperature span will also result in changing the fan speed for a given temperature, even if the minimum and maximum temperatures remain constant. Additionally, in its broadest sense, a temperature span is a relationship between an exhaust temperature and a fan speed; thus, different temperature spans may be effected by a function that maps temperature to fan speed wherein each temperature span has different coefficients or different mapping functions. Thus, implementing different temperature spans does not necessarily require changing a minimum or maximum temperature.

Additionally, the control algorithms described above included exemplary temperatures, rate of temperature changes, and predetermined time periods. These specific values are exemplary only and other, alternative values are contemplated within the scope of the present invention.

What is claimed is:

1. A method of varying an ambient air environment within a kitchen comprising the steps of:
    exhausting air from the kitchen according to one of a plurality of temperature spans, wherein each of the plurality of temperature spans has a respective minimum temperature and a respective maximum temperature over which a rate of exhausting the air varies from a minimum rate at the minimum temperature to a maximum rate at the maximum temperature;
    monitoring the ambient air environment;
    based on the monitoring of the ambient air environment, identifying another temperature span over which to exhaust air, such that the respective maximum temperature of the other temperature span differs from the respective maximum temperature of the one temperature span; and
    thereafter, exhausting air according to the other temperature span.

2. The method according to claim 1, wherein the plurality of temperature spans, denoted by their respective minimum and maximum temperatures, include: 75° F. to 90° F., 75° F. to 100° F., 75° F. to 110° F., 75° F. to 120° F., 75° F. to 130° F., to 140° F., and 75° F. to 150° F.

3. The method according to claim 1 wherein the minimum rate corresponds to a minimum speed of an exhaust fan and the maximum rate corresponds to a maximum speed of the exhaust fan.

4. The method according to claim 3, wherein the rate of exhausting the air is caused to vary by increasing an operating speed of the exhaust fan from the minimum speed to the maximum speed in a linear manner over a particular temperature span.

5. The method according to claim 1, wherein the step of monitoring occurs on a first operating day and the step of exhausting air according to the other temperature span occurs on a next operating day.

6. The method according to claim 1, wherein the step of exhausting air according to other temperature span occurs substantially immediately after the step of identifying is completed.

7. The method according to claim 1, wherein the step of exhausting air according to the other temperature span is temporary.

8. The method according to claim 1, wherein:
    a) the monitoring step further includes the step of:
        monitoring a plurality of parameters;
    b) the identifying step further includes the steps of:
        determining for each parameter, according to a respective criteria, a vote regarding whether the one temperature span should be changed to a higher temperature span having a higher respective maximum temperature or a lower temperature span having a lower respective maximum temperature;
        selecting the higher temperature span as the other temperature span, if a majority of votes is for the higher temperature span;
        selecting the lower temperature span as the other temperature span, if the majority of votes is for the lower temperature span; and
        not selecting the other temperature span, if the votes are equal in number, and
    c) wherein the step of exhausting air according the other temperature span is conditionally performed based on whether the other temperature span was selected.

9. The method according to claim 1, wherein the step of identifying includes the steps of:
    determining whether an exhaust temperature exceeded the respective maximum temperature of the one temperature span by more than a predetermined threshold over a predetermined time period; and
    in response thereto, selecting a temperature span having a higher respective maximum temperature as the other temperature span.

10. The method according to claim 9, wherein the predetermined threshold is substantially 5° F. and the predetermined time period is substantially 10 minutes.

11. The method according to claim 1, wherein the step of identifying includes the steps of:
    determining if a maximum rate of change of exhaust temperature has occurred more often than a predetermined threshold; and
    in response thereto, selecting a temperature span having a lower respective maximum temperature as the other temperature span.

12. The method according to claim 11, wherein the maximum rate of change is substantially 5° per minute and the predetermined threshold is approximately ten times within an hour.

13. The method according to claim 1, wherein the step of identifying includes the steps of:
    determining whether:
        a) an exhaust temperature exceeds a predetermined value;
        b) a rate of change of the exhaust temperature exceeds a predetermined rate; and
        c) a temporary increase of the rate of exhausting the air causes a temperature of the kitchen to decrease; and in response thereto, selecting a temperature span having a lower respective maximum temperature as the other temperature span.

14. The method according to claim 13, wherein:
the predetermined value is substantially equal to 1.2 times the respective minimum temperature of the one temperature span; and
the predetermined rate is substantially ∓3° F. per minute.

15. The method according to claim 1, wherein the step of identifying includes the steps of:
determining whether:
a) a kitchen temperature is less than a first predetermined value; or
b) the kitchen temperature is within a range of temperatures and a temperature of the outside is below a second predetermined value; and
in response thereto selecting a temperature span having a higher respective maximum temperature as the other temperature span.

16. The method according to claim 1, wherein the step of identifying includes the steps of:
determining whether a kitchen temperature is above a predetermined threshold indicative of the kitchen being uncomfortably warm for personnel within the kitchen; and
in response thereto selecting a temperature span having a lower respective maximum temperature as the other temperature span.

17. The method according to claim 1, wherein the step of identifying includes the steps of:
monitoring at least one parameter related to controlling the rate of exhausting the air; and
determining if the at least one parameter varies in a predetermined manner.

18. The method according to claim 17, wherein the at least one parameter includes a speed ratio, V, of an exhaust fan that varies between 0% and 100% according to the rate of exhausting the air.

19. The method according to claim 18, wherein the predetermined manner specifies whether an average of V exceeded a predetermined value for a particular time period.

20. The method according to claim 19, wherein the predetermined value is substantially 90% and the particular time period is an operating day.

21. The method according to claim 19, wherein the step of identifying further includes:
selecting a temperature span having a higher respective maximum temperature as the other temperature span.

22. The method according to claim 18, wherein the predetermined manner specifies whether:
a) an average of V over a particular time period is below a first value; and
b) the value of V during the particular time period remained below a second value.

23. The method according to claim 22, wherein the step of identifying further includes:
selecting a temperature span having a lower respective maximum temperature as the other temperature span.

24. The method according to claim 23, wherein the first value is 90% and the particular time period is an operating day.

25. The method according to claim 23, wherein the second value is 90% and the particular time period is an operating day.

26. The method according to claim 1, further comprising the step of:
upon initial powering-on of an exhaust hood in the kitchen, exhausting air at the maximum rate for a predetermined time period; and
substantially at an end of the predetermined time period, exhausting air at the minimum rate.

27. The method according to claim 26, wherein the predetermined time period is approximately 30 seconds.

28. An air control system for a kitchen forming part of a facility, the kitchen having a cooking unit adapted to generate heat and cooking by-product and a hood over the cooking unit, the air control system comprising:
an exhaust system associated with the hood and adapted to exhaust air according to one of a plurality of temperature spans such that air is drawn out of the ambient air environment through the hood, and wherein each of the plurality of temperature spans has a respective minimum temperature and a respective maximum temperature over which a rate of exhausting the air varies from a minimum rate at the minimum temperature to a maximum rate at the maximum temperature;
an environment sensor adapted to sense at least one parameter related to controlling the rate of exhausting the air; and
a control circuit configured to determine whether the at least one parameter varies in accordance with a predetermined criteria and, in response, identify another temperature span over which to exhaust air, such that the respective maximum temperature of the other temperature span differs from the respective maximum temperature of the one temperature span.

29. The system of claim 28, further comprising:
an exhaust fan having an fan speed, wherein the minimum rate corresponds to a minim speed of the exhaust fan and the maximum rate corresponds to a maximum speed of the exhaust fan.

30. The system of claim 29, wherein the rate of exhausting the air is caused to vary by increasing the fan speed from the minimum speed to the maximum speed in a linear manner over a particular one of the temperature spans.

31. The system of claim 28, wherein the control circuit is further configured to cause the exhaust system to use the other temperature span to exhaust air.

32. The system according to claim 31, wherein the control circuit delays causing the exhaust system to use the other temperature span until a subsequent operating day.

33. The system according to claim 28, further comprising:
a second environment sensor adapted to sense at least a second parameter related to controlling the rate of exhausting air;
the control circuit further configured to determine whether the at least second parameter varies in accordance with a second criterium; and in response identify an additional temperature span over which to exhaust air, such that the respective maximum temperature of the additional temperature span differs from the respective maximum temperature of the one temperature span.

34. The system of claim 33, wherein the control circuit is further configured to select one of the other temperature span and the additional temperature span.

35. The system of claim 33, wherein the other temperature span and the additional temperature span have different respective maximum temperatures.

36. A method of varying an ambient air environment within a kitchen comprising the steps of:
- exhausting air from the kitchen according to one temperature span, wherein the one temperature span varies, at a plurality of first rates, exhausting the air over a plurality of respective, associated temperatures;
- monitoring the ambient air environment;
- based on the monitoring of the ambient air environment, identifying a second temperature span over which to exhaust air, wherein the second temperature span varies, at a plurality of second rates, exhausting the air over a plurality of respective, associated temperatures; wherein for at least one respective temperature, the associated first rate differs from the associated second rate; and
- thereafter, exhausting air according to the other temperature span.

37. A method of varying an ambient air environment within a kitchen comprising the steps of:
- establishing a first relationship between exhaust temperature and exhaust fan speed;
- exhausting air from the kitchen according to the first relationship;
- monitoring the ambient air environment; and
- in response to the monitored air environment, exhausting air from the kitchen according to a second relationship between exhaust temperature and exhaust fan speed, wherein the second relationship is different than the first relationship.

38. The method according to claim 37, wherein each of the first and second relationships comprise a respective linear correlation between exhaust temperature and exhaust fan speed.

39. The method according to claim 38, wherein:
- the first relationship comprises a first minimum exhaust temperature and a first maximum exhaust temperature,
- the second relationship comprises a second minimum exhaust temperature and a second maximum exhaust temperature; and
- the first maximum exhaust temperature differs from the second maximum exhaust temperature.

40. The method according to claim 37, wherein, monitoring the ambient air environment further includes the step of:
- monitoring a temperature within the kitchen.

41. The method according to claim 37, wherein, monitoring the ambient air environment further includes the step of:
- monitoring exhaust temperature.

42. The method according to claim 37, wherein, monitoring the ambient air environment further includes the step of:
- monitoring a temperature outside of the kitchen.

43. The method according to claim 37, wherein, monitoring the ambient air environment further includes the steps of:
- monitoring a temperature within the kitchen;
- monitoring exhaust temperature; and
- monitoring a temperature outside of the kitchen.

44. The method according to claim 37, wherein each of the respective steps of exhausting air further include the step of varying the exhaust fan speed according to the first relationship and second relationship, respectively.

* * * * *

UNITED STATES PATENT AND TRADEMARK OFFICE
CERTIFICATE OF CORRECTION

PATENT NO. : 7,048,199 B2
APPLICATION NO. : 10/760797
DATED : May 23, 2006
INVENTOR(S) : Stephen K. Melink It is certified that error appears in the above-identified patent and that said Letters Patent is hereby corrected as shown below:

On the Title Page, In the Drawings,
Fig. 6 (to correct text in diamond 212 from "Is exhast temp" to -- Is exhaust temp -- ):

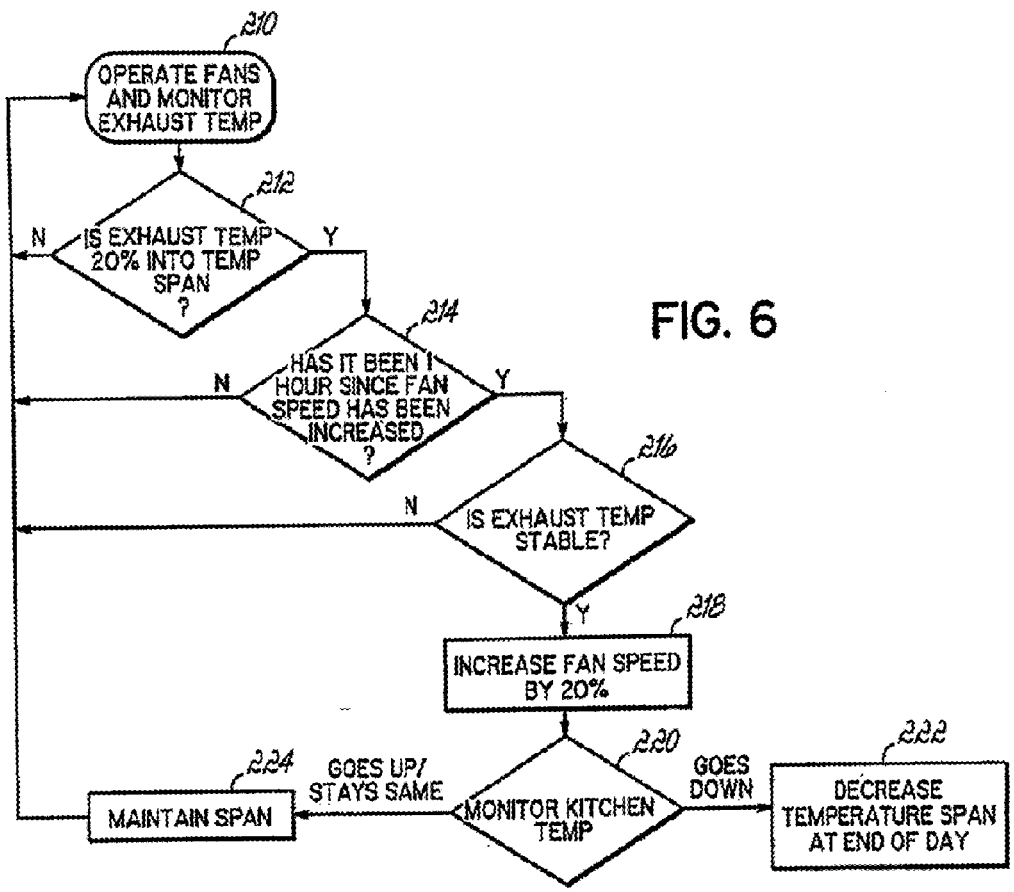

UNITED STATES PATENT AND TRADEMARK OFFICE
CERTIFICATE OF CORRECTION

PATENT NO.        : 7,048,199 B2
APPLICATION NO.   : 10/760797
DATED             : May 23, 2006
INVENTOR(S)       : Stephen K. Melink It is certified that error appears in the above-identified patent and that said Letters Patent is hereby corrected as shown below:

On the Title Page, In the Drawings,
Fig. 11 (to correct text in diamond 296 from "if itexceeds" to -- if it exceeds --, and to add arrow from box 298 to diamond 296):

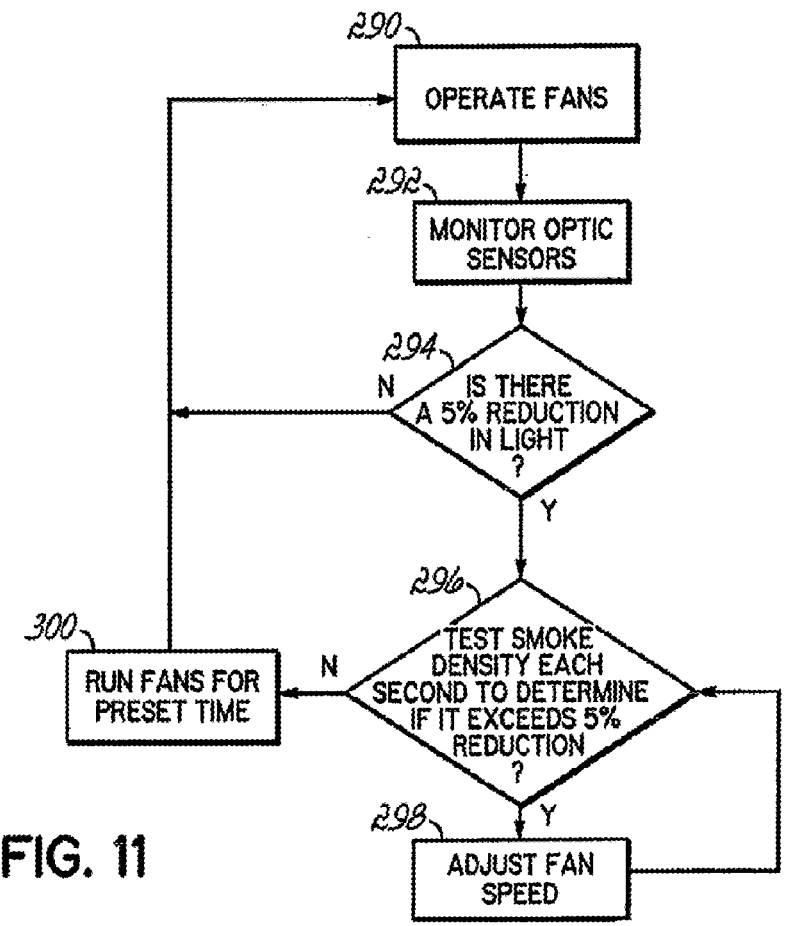

UNITED STATES PATENT AND TRADEMARK OFFICE
CERTIFICATE OF CORRECTION

PATENT NO. : 7,048,199 B2
APPLICATION NO. : 10/760797
DATED : May 23, 2006
INVENTOR(S) : Stephen K. Melink It is certified that error appears in the above-identified patent and that said Letters Patent is hereby corrected as shown below:

Column 2
Line approximately 16, "maximum temperature In" should be --maximum temperature. In --

Column 3
Line 21, delete header "BRIEF DESCRIPTION OF THE DRAWINGS".
Line 47, "span to connectively cool" should be -- span to convectively cool --

Column 5
Line approximately 34, "A such, later" should be -- As such, later --

Column 6
Line approximately 58, "at which point, the speed is" should be -- at which point the speed is --

Column 7,
Line approximately 13, "the makeup air fan" should be -- the make-up air fan --
Line approximately 52, "While, the fans" should be -- While the fans --

Column 9
Line approximately 7, "flowchart of FIG. 5, depicts" should be --flowchart of FIG. 5 depicts --
Line approximately 47, "more makeup air is" should-be -- more make-up air is --

Column 12
Line approximately 60, "determines," should be -- determine, --

Column 14
Line approximately 36, "is used" should be -- are used --
Lines approximately 64-65, "determines, if during these fluctuations, whether the" should be -- determines whether, during the fluctuations, the --

Column 15
Line approximately 53, "for the makeup air unit" should be -- for the make-up air unit --

Column 16
Line approximately 13, "the make up unit" should be -- the make-up air unit --
Line approximately 47, "provide a input" should be -- provide input --

UNITED STATES PATENT AND TRADEMARK OFFICE
CERTIFICATE OF CORRECTION

PATENT NO.         : 7,048,199 B2
APPLICATION NO. : 10/760797
DATED              : May 23, 2006
INVENTOR(S)       : Stephen K. Melink It is certified that error appears in the above-identified patent and that said Letters Patent is hereby corrected as shown below:

Column 17
Line 1, "The control system 72, then" should be -- The control system 72 then --

Claim 2, Column 17
Line 57, "to 140°F., and 75°F. to 150°F." should be -- 75°F. to 140°F., and 75°F. to 150°F. --

Claim 6, Column 18
Line 6, "according to other temperature span" should be -- according to the other temperature span --

Claim 8, Column 18
Line 30, "according the other temperature span" should be -- according to the other temperature span --

Claim 29, Column 20
Line 34, "having an fan speed," should be -- having a fan speed, --
Line 35, "minim speed of" should be -- minimum speed of --

Signed and Sealed this

Twenty-eighth Day of November, 2006

JON W. DUDAS
*Director of the United States Patent and Trademark Office*